(12) United States Patent
Ishii et al.

(10) Patent No.: US 12,517,125 B2
(45) Date of Patent: Jan. 6, 2026

(54) CONCENTRATION DEVICE, SAMPLE SOLUTION CONCENTRATION METHOD, SAMPLE SOLUTION EXAMINATION METHOD, AND EXAMINATION KIT

(71) Applicant: FUJIFILM Corporation, Tokyo (JP)

(72) Inventors: Hiroyasu Ishii, Ashigarakami-gun (JP); Junya Yoshida, Ashigarakami-gun (JP); Yoshihiro Aburaya, Ashigarakami-gun (JP)

(73) Assignee: FUJIFILM Corporation, Tokyo (JP)

( * ) Notice: Subject to any disclaimer, the term of this patent is extended or adjusted under 35 U.S.C. 154(b) by 501 days.

(21) Appl. No.: 18/181,761

(22) Filed: Mar. 10, 2023

(65) Prior Publication Data
US 2023/0228749 A1 Jul. 20, 2023

Related U.S. Application Data

(63) Continuation of application No. PCT/JP2021/030325, filed on Aug. 19, 2021.

(30) Foreign Application Priority Data

Sep. 11, 2020 (JP) ................................. 2020-152742

(51) Int. Cl.
*G01N 33/569* (2006.01)
*G01N 1/40* (2006.01)
(Continued)

(52) U.S. Cl.
CPC ......... *G01N 33/5695* (2013.01); *G01N 1/405* (2013.01); *G01N 33/54388* (2021.08); *G01N 33/92* (2013.01)

(58) Field of Classification Search
CPC ............... G01N 33/5695; G01N 1/405; G01N 33/54388; G01N 33/92; B01L 2300/0681;
(Continued)

(56) References Cited

U.S. PATENT DOCUMENTS

2004/0182795 A1* 9/2004 Dorian .................. B01D 21/26
210/782
2007/0111194 A1 5/2007 Pellaux et al.
(Continued)

FOREIGN PATENT DOCUMENTS

CA 2591245 A1 * 6/2006 ............. A61L 15/60
JP 2-311506 A 12/1990
(Continued)

OTHER PUBLICATIONS

Extended European Search Report for corresponding European Application No. 21866484.5, dated Jan. 19, 2024.
(Continued)

*Primary Examiner* — Thuan D Dang
(74) *Attorney, Agent, or Firm* — Birch, Stewart, Kolasch & Birch, LLP

(57) ABSTRACT

There are provided a concentration device for concentrating a sample solution, which makes it possible to obtain a sample solution concentrated solution having a desired concentration fold ratio, a sample solution concentration method using the concentration device, a sample solution concentration method using the sample solution examination method, and an examination kit including the concentration device. The concentration device is a concentration device for concentrating a sample solution which is an aqueous solution containing a high-molecular-weight molecule, the concentration device including a cylinder that accommodates a particulate super absorbent polymer and a piston that is insertable into the cylinder, where the cylinder has, at a bottom part, a liquid holding part for holding a part of the sample solution injected into the cylinder, the super absorbent polymer is accommodated in the cylinder to be in contact with the liquid holding part on the liquid holding part, and the piston includes the tip part having holes smaller
(Continued)

than the particle diameter of the super absorbent polymer after water absorption.

20 Claims, 17 Drawing Sheets

(51) Int. Cl.
  *G01N 33/543* (2006.01)
  *G01N 33/92* (2006.01)
(58) Field of Classification Search
  CPC ....... B01L 2300/069; B01L 2400/0478; B01L 3/502
  See application file for complete search history.

(56) References Cited

U.S. PATENT DOCUMENTS

| | | |
|---|---|---|
| 2013/0029324 A1 | 1/2013 | Rajagopal et al. |
| 2013/0231460 A1 | 9/2013 | Erbacher et al. |
| 2018/0245123 A1 | 8/2018 | Mitra et al. |
| 2019/0001321 A1 | 1/2019 | Kirschhoffer et al. |

FOREIGN PATENT DOCUMENTS

| | | |
|---|---|---|
| JP | 4-355339 A | 12/1992 |
| JP | 2013-543110 A | 11/2013 |
| JP | 2017-501698 A | 1/2017 |
| WO | WO 2005/106460 A1 | 11/2005 |

OTHER PUBLICATIONS

International Preliminary Report on Patentability and English translation of the Written Opinion of the International Searching Authority (Forms PCT/IB/326, PCT/IB/373 and PCT/ISA/237) for International Application No. PCT/JP2021/030325, dated Mar. 23, 2023.
International Search Report (Form PCT/ISA/210) for International Application No. PCT/JP2021/030325, dated Oct. 12, 2021, with English translation.

* cited by examiner

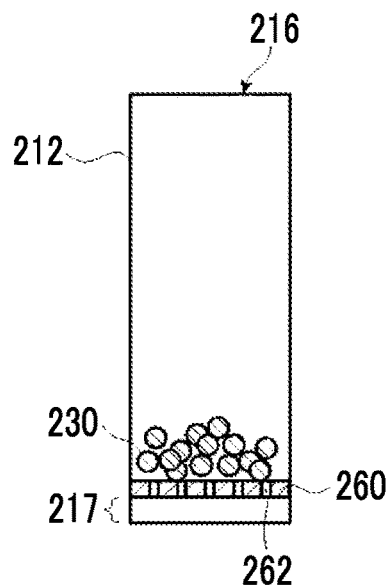
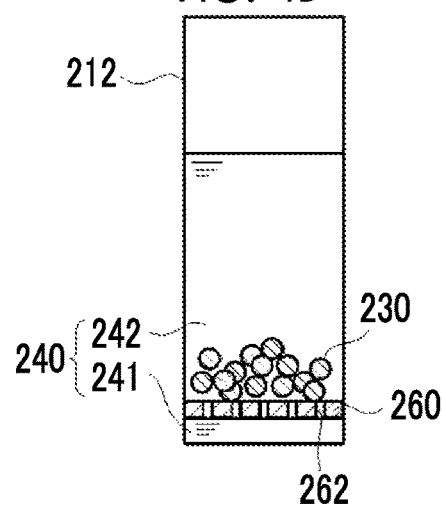
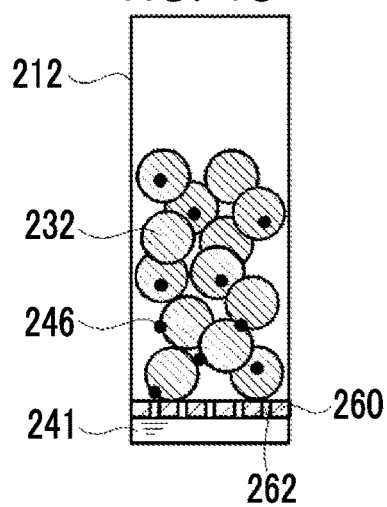

CONCENTRATION DEVICE, SAMPLE SOLUTION CONCENTRATION METHOD, SAMPLE SOLUTION EXAMINATION METHOD, AND EXAMINATION KIT

CROSS-REFERENCE TO RELATED APPLICATIONS

This application is a Continuation of PCT International Application No. PCT/JP2021/030325 filed on Aug. 19, 2021, which claims priority under 35 U.S.C. § 119(a) to Japanese Patent Application No. 2020-152742 filed on Sep. 11, 2020. The above applications are hereby expressly incorporated by reference, in its entirety, into the present application.

BACKGROUND OF THE INVENTION

1. Field of the Invention

The present invention relates to a concentration device, a sample solution concentration method, a sample solution examination method, and an examination kit.

2. Description of the Related Art

In the related art, a technique of concentrating an aqueous solution containing a high-molecular-weight molecule such as an antigen (hereinafter, also referred to as a "sample solution") with a super absorbent polymer is known (for example, JP1992-355339A (JP-H4-355339A)).

SUMMARY OF THE INVENTION

Under such circumstances, as a result of studying a sample solution concentration device using a super absorbent polymer with reference to JP1992-355339A (JP-H4-355339A) and the like, the inventors of the present invention revealed that it is difficult to control the concentration fold ratio of the concentrated solution (the sample solution concentrated solution) of the sample solution. In a case where an examination is carried out using a sample solution concentrated solution in which the concentration fold ratio is not controlled, there is a problem because a comparison failure occurs in the examination results between the sample solutions.

In consideration of the above circumstances, an object of the present invention is to provide a concentration device for concentrating a sample solution, which makes it possible to obtain a sample solution concentrated solution having a desired concentration fold ratio, a sample solution concentration method using the concentration device, a sample solution concentration method using the sample solution examination method, and an examination kit including the concentration device.

As a result of diligent studies on the above problems, the inventors of the present invention found that in a case of using a cylinder in which a super absorbent polymer is stored, the cylinder having a liquid holding part for holding a part of a sample solution injected into the cylinder, and a concentration device including a piston having holes, the above-described problems can be solved by injecting a sample solution into the cylinder of the concentration device, causing the water in the sample solution to be absorbed almost completely by the super absorbent polymer, and then adding the held sample solution thereto take out the liquid using a piston having holes, which led to the present invention.

That is, the inventors of the present invention have found that the object can be achieved by the following configurations.

(1) A concentration device for concentrating a sample solution which is an aqueous solution containing a high-molecular-weight molecule, the concentration device comprising:
a cylinder that accommodates a particulate super absorbent polymer; and
a piston that is insertable into the cylinder,
in which the cylinder has, at a bottom part, a liquid holding part for holding a part of the sample solution injected into the cylinder,
the super absorbent polymer is accommodated on the liquid holding part in the cylinder to be in contact with the liquid holding part,
the piston includes a tip part having holes smaller than a particle diameter of the super absorbent polymer after water absorption,
the super absorbent polymer absorbs water contained in the sample solution, other than the sample solution held in the liquid holding part in the sample solution injected into the cylinder, to generate a sample solution concentrate which is a concentrate of the sample solution, in the cylinder,
the sample solution held in the liquid holding part is added to the sample solution concentrate, and
the piston is inserted into the cylinder to take out a sample solution concentrated solution, which is a concentrated solution of the sample solution, from the holes in the tip part of the piston.

(2) The concentration device according to (1),
in which the liquid holding part is a portion surrounded by the bottom part of the cylinder and a partition wall movably installed on an inner peripheral surface of the cylinder in a longitudinal direction of the cylinder, where the partition wall has holes smaller than a particle diameter of the super absorbent polymer before water absorption,
the partition wall is moved to the bottom surface of the cylinder to introduce the sample solution held in the liquid holding part above the partition wall through the holes in the partition wall, and
the sample solution introduced above the partition wall is added to the sample solution concentrate.

(3) The concentration device according to (1),
in which the liquid holding part is a portion formed from holes included in a porous resin accommodated in the bottom part of the cylinder, where the holes included in the resin are smaller than a particle diameter of the super absorbent polymer before water absorption,
the resin is crushed to introduce the sample solution held in the liquid holding part above the resin through the holes in the resin, and
the sample solution introduced above the resin is added to the sample solution concentrate.

(4) The concentration device according to (3), in which the porous resin is a sponge.

(5) A concentration device for concentrating a sample solution which is an aqueous solution containing a high-molecular-weight molecule, the concentration device comprising:
a cylinder that accommodates a particulate super absorbent polymer; and a piston that is insertable into the cylinder,
in which the piston includes a tip part having holes smaller than a particle diameter of the super absorbent polymer after water absorption,
the cylinder has a liquid holding part for holding the sample solution present on a tip part of the piston in the sample solution injected into the cylinder, by fixing the tip part of the piston at a position lower than a solution surface of the sample solution injected into the cylinder and higher than the super absorbent polymer accommodated in the cylinder,
the super absorbent polymer is accommodated under the liquid holding part in the cylinder through the piston,
the cylinder and the piston include a piston position fixing mechanism for fixing the tip part of the piston to the position against pressure associated with water absorption expansion of the super absorbent polymer,
the super absorbent polymer absorbs water contained in the sample solution, other than the sample solution held in the liquid holding part in the sample solution injected into the cylinder, to generate a sample solution concentrate which is a concentrate of the sample solution, in the cylinder,
the piston position fixing mechanism is released, the piston is pulled up, and the sample solution present on the tip part of the piston is introduced below the tip part of the piston through holes in the tip part of the piston to add the sample solution present on the piston to the sample solution concentrate, and
the piston is pulled down again into the cylinder to take out a sample solution concentrated solution, which is a concentrated solution of the sample solution, from the holes in the tip part of the piston.

(6) The concentration device according to any one of (1) to (5), in which the cylinder further includes a lid having a recovery port for recovering the sample solution concentrated solution.

(7) The concentration device according to any one of (1) to (6), in which a water absorption rate of the super absorbent polymer is 0.01 g/min or more and 40 g/min or less per 1 g of the super absorbent polymer.

(8) The concentration device according to any one of (1) to (7), in which a particle diameter of the super absorbent polymer is 5 mm or less.

(9) The concentration device according to any one of (1) to (8), in which a swelling ratio of the super absorbent polymer is more than 0.2 g/g and less than 800 g/g.

(10) The concentration device according to any one of (1) to (9), in which the sample solution is an aqueous solution containing a high-molecular-weight molecule contained in a biological fluid.

(11) The concentration device according to (10), in which the cylinder further contains a binding substance that specifically binds to the high-molecular-weight molecule contained in the biological fluid.

(12) The concentration device according to (11), in which the binding substance is contained in the cylinder as a composite body with metal particles.

(13) The concentration device according to (11) or (12), in which the high-molecular-weight molecule contained in the biological fluid is an antigen, and the binding substance is an antibody against the antigen.

(14) The concentration device according to any one of (1) to (13), in which the cylinder further contains at least one selected from the group consisting of casein and tricine.

(15) The concentration device according to any one of (1) to (14), in which the sample solution is urine.

(16) A sample solution concentration method in which a sample solution which is an aqueous solution containing a high-molecular-weight molecule is concentrated using the concentration device according to any one of (1) to (15), the sample solution concentration method comprising, in the following order:
a sample solution injection step of injecting the sample solution into the cylinder while holding, in the liquid holding part, a part of the sample solution injected into the cylinder;
a water absorption step in which water contained in the sample solution, other than the sample solution held in the liquid holding part in the sample solution injected into the cylinder, is absorbed by the super absorbent polymer accommodated in the cylinder, to generate the sample solution concentrate in the cylinder;
a liquid addition step of adding the sample solution held in the liquid holding part to the sample solution concentrate; and
a taking-out step of inserting, into the cylinder, the piston insertable into the cylinder and including the tip part having holes smaller than a particle diameter of the super absorbent polymer after water absorption, to take out a sample solution concentrated solution, which is a concentrated solution of the sample solution, through the holes in the tip part of the piston.

(17) A sample solution examination method in which a high-molecular-weight molecule is detected in a sample solution which is an aqueous solution containing a high-molecular-weight molecule, the sample solution examination method comprising, in the following order:
a concentration step of using the sample solution concentration method according to (16) to obtain the sample solution concentrated solution; and
a detection step of detecting the high-molecular-weight molecule in the obtained sample solution concentrated solution.

(18) The sample solution examination method according to (17),
in which the sample solution is an aqueous solution in which an antigen is containable,
the concentration step is a step of using the sample solution concentration method according to (16) to concentrate an aqueous solution in which the antigen is containable, to obtain an antigen-concentrated solution, and
the detection step is a step of detecting the antigen in the antigen-concentrated solution by immunochromatography using an antigen-antibody reaction.

(19) The examination method according to (18), in which the detection step includes an amplification step of amplifying information on the antigen in the antigen-concentrated solution.

(20) The examination method according to (19), in which the amplification step is a silver amplification step.

(21) An examination kit for detecting a high-molecular-weight molecule in a sample solution which is an aqueous solution containing a high-molecular-weight molecule, the examination kit comprising:
the concentration device according to any one of (1) to (15); and
a detection device for detecting a high-molecular-weight molecule in a sample solution concentrated solution obtained by the sample solution concentration method according to (16).

(22) The examination kit according to (21), in which the detection device is an immunochromatograph.

(23) The examination kit according to (21) or (22), in which the detection device includes a pot in which an amplification solution for amplifying a signal for detecting the high-molecular-weight molecule in the sample solution concentrated solution is enclosed.

As shown below, according to the present invention, it is possible to provide a concentration device for concentrating a sample solution, which makes it possible to obtain a sample solution concentrated solution having a desired concentration fold ratio, a sample solution concentration method using the concentration device, a sample solution concentration method using the sample solution examination method, and an examination kit including the concentration device.

BRIEF DESCRIPTION OF THE DRAWINGS

FIG. 4A is a view illustrating a first state among schematic cross-sectional views illustrating one aspect of a sample solution concentration method using the aspect A1 of the concentration device according to the present invention in the order of steps.

FIG. 4B is a view illustrating a sample solution injection step among schematic cross-sectional views illustrating one aspect of a sample solution concentration method using the aspect A1 of the concentration device according to the present invention in the order of steps.

FIG. 4C is a view illustrating a water absorption step among schematic cross-sectional views illustrating one aspect of a sample solution concentration method using the aspect A1 of the concentration device according to the present invention in the order of steps.

DESCRIPTION OF THE PREFERRED EMBODIMENTS

Figure 1:
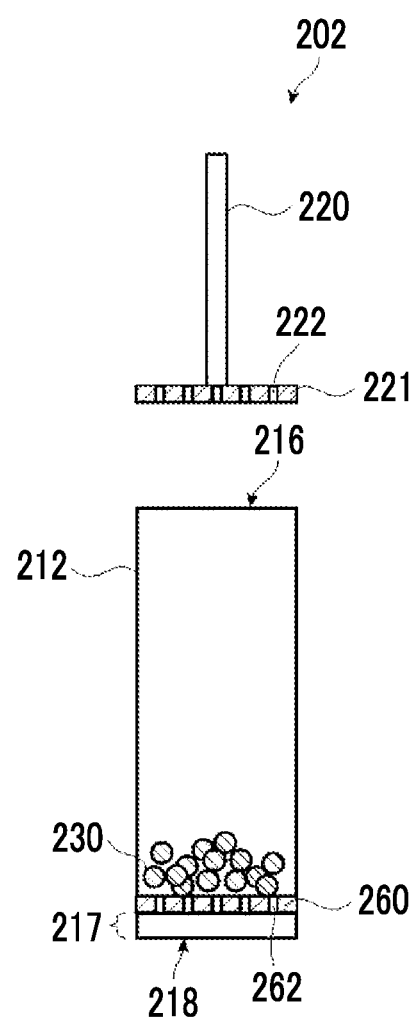
FIG. 1 is a schematic cross-sectional view illustrating one aspect of an aspect A1 of a concentration device according to the present invention.

Hereinafter, a concentration device according to the embodiment of the present invention, a sample solution concentration method according to the embodiment of the present invention, a sample solution examination method according to the embodiment of the present invention, and an examination kit according to the embodiment of the present invention will be described.

In the present specification, the numerical value range indicated by using "to" means a range including the numerical values before and after "to" as the lower limit value and the upper limit value, respectively.

In addition, in the present specification, one kind of each component may be used alone, or two or more kinds thereof may be used in combination. In a case where two or more kinds of each component are used in combination, a content of the component indicates a total content unless otherwise specified.

In addition, in the present specification, the fact that a sample solution concentrated solution having a desired concentration fold ratio can be obtained in a case where a sample solution is concentrated using the concentration device according to the embodiment of the present invention and the concentration of the sample solution concentrated solution to be obtained is highly uniform and the fact that in the sample solution examination method according to the embodiment of the present invention, the detection sensitivity is high and the signal/noise ratio (the S/N ratio) is high are also referred to that the effect and the like of the present invention is excellent.

[I] Concentration Device

Hereinafter, the concentration device according to the embodiment of the present invention will be described.

[1] Aspect A

An aspect A of the concentration device according to the embodiment of the present invention is a concentration device which is a concentration device for concentrating a sample solution which is an aqueous solution containing a high-molecular-weight molecule, the concentration device including a cylinder that accommodates a particulate super absorbent polymer and a piston that is insertable into the cylinder, where in the concentration device, the cylinder has, at a bottom part, a liquid holding part (hereinafter, also referred to as an "extraction solution holding part") for holding a part of the sample solution injected into the cylinder, the super absorbent polymer is accommodated on the extraction solution holding part in the cylinder to be in contact with the extraction solution holding part, the piston includes the tip part having holes smaller than the particle diameter of the super absorbent polymer after water absorption, the super absorbent polymer absorbs the water contained in the sample solution other than the sample solution held in the extraction solution holding part, in the sample solution injected into the cylinder, to generate a sample solution concentrate which is a concentrate of the sample solution, in the cylinder, the sample solution held in the extraction solution holding part (hereinafter, also referred to as the "extraction solution") is added to the sample solution concentrate, and the piston is inserted into the cylinder to take out a sample solution concentrated solution, which is a concentrated solution of the sample solution, from the holes in the tip part of the piston.

Examples of the specific aspect of the aspect A include an aspect A1 and an aspect A2.

[2] Aspect A1

In the aspect A described above, the aspect A1 is an aspect in which the extraction solution holding part is a portion surrounded by the bottom part of the cylinder and a partition wall movably installed on an inner peripheral surface of the cylinder in a longitudinal direction of the cylinder, where the partition wall has holes smaller than a particle diameter of the super absorbent polymer before water absorption, the partition wall is moved to the bottom surface of the cylinder to introduce the sample solution held in the extraction solution holding part above the partition wall through the hole of the partition wall, and the sample solution introduced above the partition wall is added to the sample solution concentrate.

The aspect A1 will be described with reference to the drawings.

FIG. 1 is a schematic cross-sectional view of one aspect of the suitable aspect A1.

As illustrated in FIG. 1, a concentration device 202 includes the cylinder 212 that accommodates the super absorbent polymer 230 and the piston 220 that is insertable into the cylinder 212. The piston 220 includes the tip part 221 having the holes 222 smaller than the particle diameter of the super absorbent polymer 230 after water absorption.

Here, the cylinder 212 has a partition wall 260 that is movably installed on the inner peripheral surface of the cylinder 212 in the longitudinal direction of the cylinder 212. In addition, the partition wall 260 has holes 262 smaller than the particle diameter of the super absorbent polymer 230 before water absorption. In addition, the super absorbent polymer 230 is accommodated in the cylinder 212 on the partition wall 260 to be in contact with the partition wall 260.

the portion surrounded by the bottom part 217 and the partition wall 260 of the cylinder 212 serves as the extraction solution holding part.

Hereinafter, a sample solution concentration method using the aspect A1 will be described, and each member and the like constituting the aspect A1 will also be described.

[3] Sample Solution Concentration Method Using Aspect A1

The sample solution concentration method in which the sample solution, which is an aqueous solution containing a high-molecular-weight molecule, is concentrated using the aspect A1, is a sample solution concentration method including, in the following order;

a sample solution injection step of injecting the sample solution into the cylinder while holding a part of the sample solution injected into the cylinder, in the extraction solution holding part, a water absorption step in which water contained in the sample solution other than the sample solution held in the extraction solution holding part, in the sample solution injected into the cylinder, is absorbed by the super absorbent polymer accommodated in the cylinder, to generate the sample solution concentrate in the cylinder, a liquid addition step (hereinafter, also referred to as an "extraction solution addition step addition step") of adding the sample solution held in the extraction solution holding part to the sample solution concentrate, and a taking-out step of inserting, into the cylinder, the piston insertable into the cylinder and including a tip part having a hole smaller than a particle diameter of the super absorbent polymer after water absorption, to take out a sample solution concentrated solution, which is a concentrated solution of the sample solution, through the hole in the tip part of the piston, where the extraction solution addition step is a step of moving the partition wall to the bottom surface of the cylinder and introducing the sample solution held in the extraction solution holding part above the partition wall through the hole of the partition wall, to add the sample solution held in the extraction solution holding part to the sample solution concentrate.

The sample solution concentration method using the aspect A1 will be described with reference to the drawings.

Figure 4D:
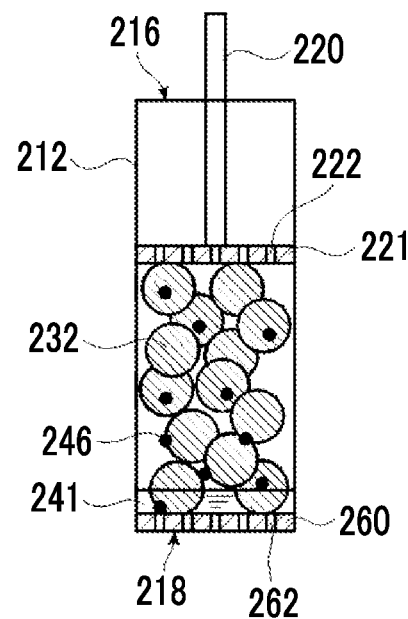
FIG. 4D is a view illustrating an extraction solution addition step among schematic cross-sectional views illustrating one aspect of a sample solution concentration method using the aspect A1 of the concentration device according to the present invention in the order of steps.
Figure 4E:
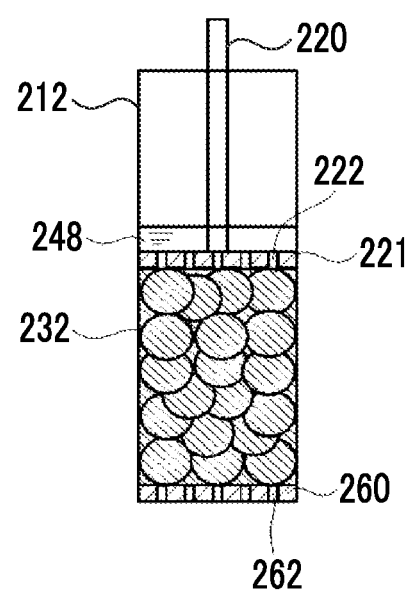
FIG. 4E is a view illustrating a taking-out step among schematic cross-sectional views illustrating one aspect of a sample solution concentration method using the aspect A1 of the concentration device according to the present invention in the order of steps.

FIG. 4 (FIG. 4A to FIG. 4E) are schematic cross-sectional views illustrating one aspect of the sample solution concentration method using the aspect A1, in the order of steps.

First, in the sample solution injection step, a sample solution 240 is injected from an opening portion 216 into a cylinder 212 (FIG. 4A) in which a particulate super absorbent polymer 230 is accommodated (FIG. 4B).

Here, the cylinder 212 has a partition wall 260 that is movably installed on the inner peripheral surface of the cylinder 212 in the longitudinal direction of the cylinder 212. In addition, the partition wall 260 has holes 262 smaller than the particle diameter of the super absorbent polymer 230 before water absorption. In addition, the super absorbent polymer 230 is accommodated in the cylinder 212 on the partition wall 260 to be in contact with the partition wall 260.

In a case where the sample solution 240 is injected into the cylinder 212 as described above, a part of the sample solution 240 is introduced below the partition wall 260 through the holes 262 in the partition wall 260. Then, in the water absorption step described later, only the water contained in a sample solution 242 present on the partition wall 260 in the sample solution 240 is absorbed by the super absorbent polymer 230, but the water contained in the sample solution 241 present under the partition wall 260 in the sample solution 240 is not absorbed by the super absorbent polymer 230.

That is, the sample solution injection step serves as a step of injecting the sample solution 240 into the cylinder 212 while holding a part (the sample solution 241) of the sample solution injected into the cylinder 212 as the extraction solution to be added in the extraction solution addition step described later, in a portion (the extraction solution holding part) surrounded by a bottom part 217 and the partition wall 260 of the cylinder 212.

Then, in the water absorption step, only the water contained in the sample solution 242 (the sample solution 242 other than the sample solution 241 held in the extraction solution holding part in the sample solution 240) present on the partition wall 260 in the sample solution 240 is absorbed by the super absorbent polymer 230, and the sample solution concentrate 246, which is a concentrate of the sample solution 242, is generated in the cylinder 212 (the super absorbent polymer 230 becomes a swollen super absorbent polymer 232) (FIG. 4C).

Next, in the extraction solution addition step, the partition wall 260 is moved to a bottom surface 218 of the cylinder 212, and the sample solution 241 held in the extraction solution holding part is introduced above the partition wall 260 through the holes 262 in the partition wall 260 to add the sample solution 241 held in the extraction solution holding part to the sample solution concentrate 246 (FIG. 4D). It is noted that in FIG. 4D, although the piston 220 to be used in the taking-out step described later is inserted into the cylinder 212 from the opening portion 216, and the super absorbent polymer 232 is pushed down to move the partition wall 260 to the bottom surface 218 of the cylinder 212, the method of moving the partition wall 260 is not limited to this, and for example, a mechanism for moving the partition wall 260 may be provided independently of the piston 220. In addition, instead of moving the partition wall 260, the bottom surface 218 may be made to be movable in the longitudinal direction of the cylinder 212 to move the bottom surface 218 to the partition wall 260, and the sample solution 241 held in the extraction solution holding part may be introduced above the partition wall 260 through the holes 262 in the partition wall 260 to add the sample solution 241 held in the extraction solution holding part to the sample solution concentrate 246.

Further, in the taking-out step, the piston 220 insertable into the cylinder 212 is inserted into the cylinder 212, where the piston 220 includes a tip part 221 having the holes 222 smaller than a particle diameter (a particle diameter of the swollen super absorbent polymer 232) of the super absorbent polymer 230 after water absorption, to take out the sample solution concentrated solution 248, which is a concentrated solution of the sample solution 240, through the holes 222 in the tip part 221 of the piston 220 (FIG. 4E).

Hereinafter, each of the steps will be described.

[Sample Solution Injection Step]

As described above, the sample solution injection step is a step of injecting the sample solution into the cylinder while holding a part of the sample solution injected into the cylinder, in the extraction solution holding part.

[Cylinder]

The shape of the cylinder is not particularly limited; however, it is preferably cylindrical.

In general, one end of the cylinder in the longitudinal direction is closed (the bottom surface), and the other end thereof is open (the opening portion).

The material of the cylinder is not particularly limited; however, it is preferably a thermoplastic resin since thermoplastic resin can be subjected to injection molding, is inexpensive, and can be produced on a large scale. Specifically, it is preferably polypropylene, acryl, polyacetal, polyamide, polyethylene, polyethylene terephthalate, polycarbonate, polystyrene, polyphenylene sulfide, polybutylene terephthalate, polyvinyl chloride, an acrylonitrile-butadiene-styrene copolymer resin (an ABS resin), or an acrylonitrile-styrene copolymer resin (an AS resin) since this has a certain degree of hardness.

[Particulate Super Absorbent Polymer]

The particulate super absorbent polymer (SAP) accommodated in the cylinder is not particularly limited; however, due to the reason that the effect and the like of the present invention are more excellent, it is preferably a polyacrylic acid-based, polyacrylamide-based, cellulose-based, or polyethylene oxide-based polymer.

<Swelling Ratio>

The swelling ratio of the super absorbent polymer is not particularly limited; however, due to the reason that the effect and the like of the present invention are more excellent, it is preferably more than 0.2 g/g and less than 800 g/g, more preferably 1.0 g/g or more and 600 g/g or less, still more preferably 10 g/g or more and 500 g/g or less, and particularly preferably 20 g/g or more and 100 g/g or less.

Here, the swelling ratio is a value defined as "a mass (g) of water retained by 1 g of a super absorbent polymer".

(Method of Measuring Swelling Ratio)

A mass of a super absorbent polymer stored for 10 days at 25° C. and 5% of relative humidity (RH) is measured, and immediately after the measurement, the super absorbent polymer is immersed in a large amount of distilled water. After 120 minutes, the super absorbent polymer is taken out, the water on the surface thereof is removed, the mass thereof is measured again, and the swelling ratio thereof is measured using the following expression.

{(Mass (g) after water absorption−initial mass (g) before water absorption)/initial mass (g) before water absorption}

The method of adjusting the swelling ratio to the above-described specific range is not particularly limited; however, examples thereof include changing the kind of the polymer, changing the molecular weight of the polymer, changing the degree of crosslinking of the polymer, and changing the particle diameter of the polymer.

<Water Absorption Rate>

The water absorption rate of the super absorbent polymer is not particularly limited; however, due to the reason that the effect and the like of the present invention are more excellent, it is preferably 0.01 g/min or more and 40 g/min or less per 1 g of super absorbent polymer, and more preferably 0.02 g/min or more and 40 g/min or less per 1 g of super absorbent polymer.

The water absorption rate is measured as follows.

A mass (a mass $M_0$, unit: g) of a super absorbent polymer stored for 10 days at 25° C. and 5% of relative humidity (RH) is measured, and immediately after the measurement, the super absorbent polymer is immersed in a large amount of distilled water. After 10 minutes, the super absorbent polymer is taken out, the water on the surface thereof is removed, and the mass thereof (a mass $M_{10}$) is measured. Immediately after the mass measurement, the super absorbent polymer is immersed again in a large amount of distilled water. After 10 minutes, the super absorbent polymer is taken out, the water on the surface thereof is removed, and the mass thereof (a mass $M_{20}$) is measured again. Immediately after the measurement of mass $M_{20}$, the super absorbent polymer is immersed again in a large amount of distilled water. After 10 minutes, the super absorbent polymer is taken out, the water on the surface thereof is removed, and the mass thereof (a mass $M_{30}$) is measured again.

The water absorption amount is defined as follows.

Water absorption amount for 10 minutes: $\Delta M10=(M_{10}-M_0)/M_0$ Water absorption amount for 20 minutes: $\Delta M20=(M_{20}-M_0)/M_0$ Water absorption amount for 30 minutes: $\Delta M30=(M_{30}-M_0)/M_0$ Using the water absorption amount defined as described above, the water absorption rate is calculated as follows.

Three points are plotted on the X-Y plane as the horizontal axis of time (x=10, 20, 30, unit: minute) and the vertical axis of water absorption amount (y=$\Delta M10$, $\Delta M20$, $\Delta M30$, unit: g (water)/g (polymer amount)), to obtain a linear approximate expression of the water absorption amount with respect to the time by using the least squares method, and the slope of the linear approximate expression is defined as the water absorption rate per unit time (minute).

<Particle Diameter>

The particle diameter of the super absorbent polymer is preferably 10 mm or more, more preferably 8 mm or more, and still more preferably 5 mm or more, due to the reason that the effect and the like of the present invention are more excellent. The lower limit of the particle diameter of the super absorbent polymer is preferably 0.01 mm or more, more preferably 0.1 mm or more, and still more preferably 1 mm or more, due to the reason that the effect and the like of the present invention are more excellent.

Here, the particle diameter can be determined as an arithmetic average value obtained by measuring the diameters of 50 particulate polymers with an optical microscope.

[Binding Substance that Specifically Binds to High-Molecular-Weight Molecule Contained in Biological Fluid]

Due to the reason that the effect and the like of the present invention are more excellent, it is preferable that the cylinder further contains a binding substance that specifically binds to a high-molecular-weight molecule contained in a biological fluid in a sample solution described later. In a case where the cylinder contains the binding substance, for example, an antigen-antibody reaction proceeds concurrently with the concentration of the sample solution, and a composite body of an antigen in the sample solution and a labeled antibody is formed in a concentrated state, which leads to the improvement of the detection sensitivity.

Examples of the binding substance include a first binding substance (particularly an antibody) described later. That is, in the present invention, it is preferable that the high-molecular-weight molecule contained in the biological fluid is an antigen and the binding substance is an antibody due to the reason that the effect and the like of the present invention are more excellent.

Due to the reason that the effect and the like of the present invention are more excellent, it is preferable that the binding substance is contained in the cylinder as a composite body with a labeling substance.

Examples of the composite body include a labeled antibody.

Here, the labeled antibody is an antibody to which a detectable labeling substance binds, and the labeling substance is, for example, a detectable substance and is a directly detectable substance, for example, a substance capable of generating color, fluorescence, or an electromagnetic wave such as light, or a substance capable of scattering color, fluorescence, or an electromagnetic wave such as light. Furthermore, it is a substance or state including an enzyme or the like, which forms a luminescent substance or coloring substance by interacting with a luminescent substance precursor or coloring substance precursor.

The labeled antibody is preferably an antibody modified with a metal particle that exhibits a vivid color tone upon irradiation with an electromagnetic wave such as visible light due to the reason that the effect and the like of the present invention are more excellent. Due to the reason that the effect and the like of the present invention are more excellent, the metal particle is more preferably a gold particle. Due to the reason that the effect and the like of the present invention are more excellent, the labeled antibody is preferably an antibody labeled with a gold particle, that is, a gold particle modified with an antibody (a modified gold particle described later).

The labeled antibody may be contained in the cylinder as a pad (a gold colloid holding pad) on which the modified gold colloid particles which are gold colloid particles modified with the antibody are held.

[Casein and Tricine]

Due to the reason that the effect and the like of the present invention are more excellent, the cylinder preferably contains at least one selected from the group consisting of casein and tricine and more preferably contains both casein and tricine.

Casein is conceived to have a function of suppressing false positivity. In addition, in a case where the pH of the sample solution such as urine is acidic, which is likely to cause false positivity, it is conceived that tricine has a function of adjusting the pH to be neutral to alkaline, thereby suppressing false positivity.

[Extraction Solution Holding Part]

The piston includes an extraction solution holding part.

The extraction solution holding part is a portion surrounded by the bottom part of the cylinder and a partition wall movably installed on an inner peripheral surface of the cylinder in a longitudinal direction of the cylinder. The partition wall has holes smaller than the particle diameter of the super absorbent polymer before water absorption.

<Partition Wall>

The material of the partition wall is not particularly limited, and the suitable aspect thereof is the same as that of the cylinder described above.

As described above, the partition wall has holes smaller than the particle diameter of the super absorbent polymer before water absorption. Therefore, the super absorbent polymer does not fall under the partition wall.

Due to the reason that the effect and the like of the present invention are more excellent, it is preferable that the diameter of the holes in the partition wall is ⅔ or less of the particle diameter of the super absorbent polymer before water absorption.

Due to the reason that the effect and the like of the present invention are more excellent, the diameter of the holes in the partition wall is preferably 0.05 to 5 mm, more preferably 0.1 to 3 mm, and still more preferably 0.2 to 2 mm.

The number of holes in the partition wall, included in the tip part, is not particularly limited; however, it is preferably 10 to 100 and more preferably 20 to 50.

Due to the reason that the effect and the like of the present invention are more excellent, the proportion of the total area of the holes in the partition wall with respect to the area of the partition wall is preferably 5% or more, more preferably 10% or more, and still more preferably 15%.

[Sample Solution]

The sample solution is an aqueous solution containing a high-molecular-weight molecule. Among the above, an aqueous solution containing a high-molecular-weight molecule contained in a biological fluid is preferable.

Specific examples of the sample solution include a biological specimen, particularly a biological specimen of animal origin (particularly, of human origin) such as a body fluid (for example, blood, serum, plasma, spinal fluid, tear fluid, sweat, urine, pus, nasal discharge, or sputum), and a mouthwash. Among them, the specimen including an antigen as the high-molecular-weight molecule is preferably serum, plasma, urine, or nasal discharge, and it is particularly preferably urine due to the reason that the effect and the like of the present invention are more excellent.

<High-Molecular-Weight Molecule Contained in Biological Fluid>

The high-molecular-weight molecule (particularly the antigen) contained in the biological fluid is, for example, a high-molecular-weight molecule that is useful mainly for determining a disease, and examples thereof include a fungus, a bacterium (for example, tubercle bacillus or lipoarabinomannan (LAM) included in the tubercle bacillus), bacteria, a virus (for example, an influenza virus), and a nuclear protein thereof, which are detected in biological fluids. LAM is a major antigen in tuberculosis and a glycolipid which is a major constitutional component of the cell membrane and the cell wall.

Due to the reason that the effect and the like of the present invention are more excellent, the high-molecular-weight molecule contained in the biological fluid is preferably an antigen, more preferably a virus (particularly, an influenza virus) or LAM, and still more preferably LAM.

Due to the reason that the effect and the like of the present invention are more excellent, the molecular weight of the high-molecular-weight molecule contained in the biological fluid is preferably 1000 or more and more preferably 2,000 or more. In a case where the high-molecular-weight molecule is a high-molecular-weight molecule useful for determining a disease and the structural formula thereof is known, a theoretical value that is calculated from the structural formula can be used as the molecular weight. In addition, in a case where the structural formula has not been determined, the molecular weight can be determined according to a method of calculating a molecular weight by comparison with a substance having a known molecular weight by using an electrophoresis method or according to a liquid chromatography mass analysis method (LC-MS).

<Pretreatment of Sample Solution>

Regarding the sample solution, it is possible to use a sample solution as it is or in a form of a liquid obtained by extracting an antigen using an appropriate solvent for extraction, in a form of a diluent solution obtained by diluting, with an appropriate diluent, a liquid obtained by extraction, or in a form in which an extraction solution has been concentrated by an appropriate method.

As the solvent for extraction, it is possible to use a solvent (for example, water, physiological saline, and a buffer solution) that is used in a general immunological analysis method, or a water-miscible organic solvent with which a direct antigen-antibody reaction can be carried out by being diluted with such a solvent.

[Proportion of Super Absorbent Polymer with Respect to Sample Solution]

The proportion of the super absorbent polymer with respect to the sample solution is not particularly limited; however, it is preferably 0.01 to 100 g and more preferably 0.1 to 50 g with respect to 1 mL of the sample solution due to the reason that the effect and the like of the present invention are more excellent.

[Water Absorption Step]

As described above, the water absorption step is a water absorption step in which water contained in the sample solution other than the sample solution held in the extraction solution holding part, in the sample solution injected into the cylinder, is absorbed by the super absorbent polymer accommodated in the cylinder, to generate the sample solution concentrate in the cylinder.

In the water absorption step, in general, the water contained in the sample solution other than the sample solution held in the extraction solution holding part, in the sample solution injected into the cylinder, is allowed to stand until almost completely absorbed by the super absorbent polymer accommodated in the cylinder.

[Sample Solution Concentrate]

As described above, in the water absorption step, a sample solution concentrate which is a concentrate of the sample solution is generated in the cylinder.

In a case where the sample solution and the super absorbent polymer are mixed, the water in the sample solution is incorporated into the super absorbent polymer, whereas a high-molecular-weight molecule (for example, an antigen)

in the sample solution is hardly incorporated into the super absorbent polymer since the antigen has a certain degree of hydrodynamic radius and thus the network structure on the surface of the super absorbent polymer exhibits a sieving effect. As a result, the high-molecular-weight molecule (for example, the antigen) in the sample solution is concentrated.

In general, the sample solution concentrate is present in the vicinity of the super absorbent polymer as a precipitate of the high-molecular-weight molecule or a high-concentration solution of the high-molecular-weight molecule dissolved in a trace amount of the residual liquid.

[Extraction Solution Addition Step]

As described above, the extraction solution addition step is a step of adding a sample solution held in the extraction solution holding part, to the sample solution concentrate generated in the water absorption step described above.

The extraction solution has a role of extracting (taking out) the sample solution concentrate generated in the water absorption step.

Examples of the method of adding the extraction solution include the method in which, as described above, the piston to be used in the taking-out step described later is inserted into the cylinder from the opening portion of the cylinder, and the super absorbent polymer 232 is pushed down to move the partition wall to the bottom surface of the cylinder 212, a method in which a mechanism for moving the partition wall is provided independently of the piston, and a method in which the bottom surface is configured to be movable in the longitudinal direction of the cylinder 212 instead of moving the partition wall and the bottom surface 218 is moved to the partition wall 260.

The proportion of the amount of the extraction solution (the sample solution held in the extraction solution holding part) with respect to the amount of the sample solution to be injected into the cylinder (the extraction solution/the sample solution) may be less than 100%; however, it is preferably 30% or less, more preferably 20% or less, and still more preferably 1% or more and 10% or less due to the reason that the effect and the like of the present invention are more excellent.

[Taking-Out Step]

As described above, the taking-out step is a step of inserting, into the cylinder after the water absorption step described above, the piston insertable into the cylinder and including a tip part having a hole smaller than a particle diameter of the above-described super absorbent polymer after water absorption, to take out a sample solution concentrated solution, which is a concentrated solution of the sample solution described above, through the hole in the tip part of the piston.

In the taking-out step, the piston is inserted into the cylinder, and the tip part having holes is pushed against the super absorbent polymer. At this time, since the extraction solution is collected upward while moving thoroughly through the gaps between the super absorbent polymers, the stirring effect obtained at this time makes it possible to obtain a uniform sample solution concentrated solution.

[Piston]

The piston is a piston that is insertable into a cylinder, where the piston includes a tip part having holes smaller than the particle diameter of the above-described super absorbent polymer after water absorption.

The material of the piston is not particularly limited, and the suitable aspect thereof is the same as that of the cylinder described above.

As described above, the tip part of the piston has holes smaller than the particle diameter of the above-described super absorbent polymer after water absorption. It is noted that the particle diameter of the super absorbent polymer after water absorption can be determined as an arithmetic average value obtained by measuring the diameters of 50 particulate polymers with an optical microscope.

Due to the reason that the effect and the like of the present invention are more excellent, the diameter of the holes in the tip part is preferably ½ or less, more preferably ⅕ or less, and still more preferably 1/10 or less of the particle diameter of the super absorbent polymer after water absorption.

Due to the reason that the effect and the like of the present invention are more excellent, it is preferable that the diameter of the holes in the tip part is smaller than the particle diameter of the super absorbent polymer before water absorption.

Due to the reason that the effect and the like of the present invention are more excellent, the diameter of the holes in the tip part is preferably 0.01 to 5 mm and more preferably 0.1 to 2 mm.

The number of holes included in the tip part is not particularly limited; however, it is preferably 10 to 100 and more preferably 20 to 50.

Due to the reason that the effect and the like of the present invention are more excellent, the proportion of the total area of the holes in the tip part with respect to the area of the tip part is preferably 5% or more, more preferably 10% or more, and still more preferably 15%.

[Sample Solution Concentrated Solution]

As described above, in the taking-out step, a sample solution concentrated solution is obtained. The amount of the sample solution concentrated solution is approximately the amount of the extraction solution. That is, the concentration fold ratio of the sample solution concentrated solution is approximately "the sample solution/the extraction solution". Therefore, in a case of making the amounts of the sample solution and the extraction solution (the sample solution held in the extraction solution holding part) constant (in a case of making the amount of the sample solution injected into the cylinder and the amount of the extraction solution holding part constant), it is possible to obtain a sample solution concentrated solution having a desired concentration fold ratio.

[4] Aspect A2

In the aspect A described above, the aspect A2 is an aspect in which the extraction solution holding part is a portion formed from pores included in a porous resin accommodated in the bottom part of the cylinder, where the pores included in the resin are smaller than a particle diameter of the super absorbent polymer before water absorption, the resin is crushed to introduce the sample solution held in the extraction solution holding part onto the resin through the holes of the resin, and the sample solution introduced above the resin is added to the sample solution concentrate.

The aspect A2 will be described with reference to the drawings.

Figure 2:
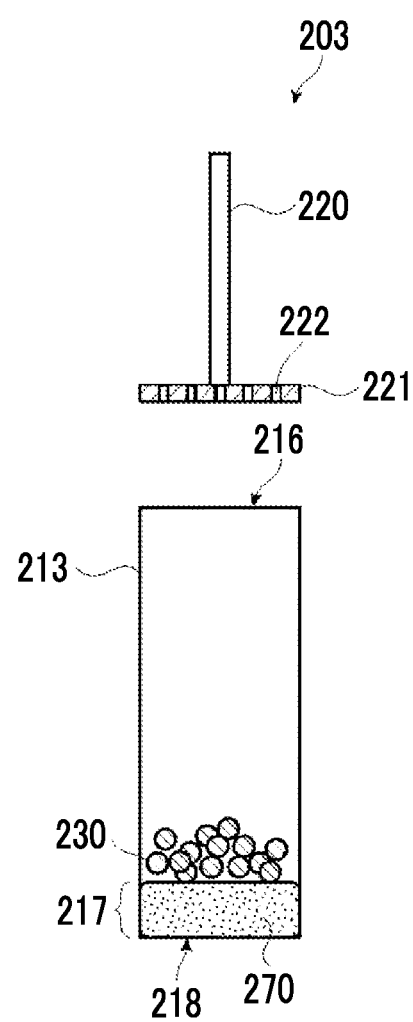
FIG. 2 is a schematic cross-sectional view illustrating one aspect of an aspect A2 of the concentration device according to the present invention.

FIG. 2 is a schematic cross-sectional view of one aspect of the suitable aspect A2.

As illustrated in FIG. 2, a concentration device 203 includes the cylinder 213 that accommodates the super absorbent polymer 230 and the piston 220 that is insertable into the cylinder 213. The piston 220 includes the tip part 221 having the holes 222 smaller than the particle diameter of the super absorbent polymer 230 after water absorption.

Here, a porous synthetic resin 270 is accommodated in the bottom part 217 of the cylinder 213. In addition, the holes (not illustrated in the drawing) included the synthetic resin 270 are smaller than the particle diameter of the super absorbent polymer 230 before water absorption. In addition, the super absorbent polymer 230 is accommodated in the cylinder 213 on the synthetic resin 270 to be in contact with the synthetic resin 270.

the holes included in the synthetic resin 270 serve as the extraction solution holding part.

Hereinafter, a sample solution concentration method using the aspect A2 will be described, and each member and the like of the aspect A2 will also be described.

[5] Sample Solution Concentration Method Using Aspect A2

The sample solution concentration method in which the sample solution, which is an aqueous solution containing a high-molecular-weight molecule, is concentrated using the aspect A2, is a sample solution concentration method including, in the following order;

a sample solution injection step of injecting the sample solution into the cylinder while holding a part of the sample solution injected into the cylinder, in the extraction solution holding part, a water absorption step in which water contained in the sample solution other than the sample solution held in the extraction solution holding part, in the sample solution injected into the cylinder, is absorbed by the super absorbent polymer accommodated in the cylinder, to generate the sample solution concentrate in the cylinder, a liquid addition step (hereinafter, also referred to as an "extraction solution addition step addition step") of adding the sample solution held in the extraction solution holding part to the sample solution concentrate, and a taking-out step of inserting, into the cylinder, the piston insertable into the cylinder and including a tip part having a hole smaller than a particle diameter of the super absorbent polymer after water absorption, to take out a sample solution concentrated solution, which is a concentrated solution of the sample solution, through the hole in the tip part of the piston, where the extraction solution addition step is a step of crushing the resin and introducing the sample solution held in the extraction solution holding part above the resin through the holes of the resin, to add the sample solution held in the extraction solution holding part to the sample solution concentrate.

The sample solution concentration method using the aspect A2 will be described with reference to the drawings.

FIG. 5 (FIG. 5A to FIG. 5E) are schematic cross-sectional views illustrating one aspect of the concentration method of the aspect A2 in the order of steps.

Figure 5A:
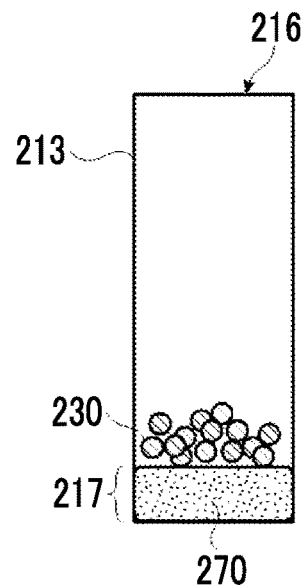
FIG. 5A is a view illustrating a first state among schematic cross-sectional views illustrating one aspect of a sample solution concentration method using the aspect A2 of the concentration device according to the present invention in the order of steps.
Figure 5B:
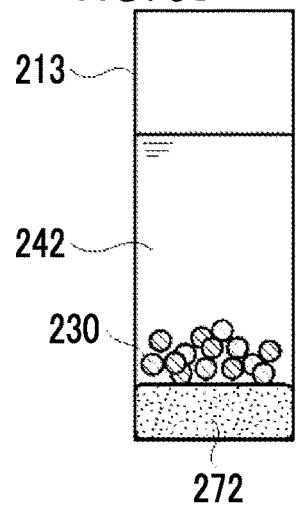
FIG. 5B is a view illustrating a sample solution injection step among schematic cross-sectional views illustrating one aspect of a sample solution concentration method using the aspect A2 of the concentration device according to the present invention in the order of steps.

First, in the sample solution injection step, a sample solution is injected from an opening portion 216 into a cylinder 213 (FIG. 5A) in which a particulate super absorbent polymer 230 is accommodated (FIG. 5B).

Here, a porous synthetic resin 270 is accommodated in the bottom part 217 of the cylinder 213. The holes (not illustrated in the drawing) included the synthetic resin 270 are smaller than the particle diameter of the super absorbent polymer 230 before water absorption. In addition, the super absorbent polymer 230 is accommodated in the cylinder 213 on the synthetic resin 270 to be in contact with the synthetic resin 270.

In a case where the sample solution is injected into the cylinder 213 as described above, a part of the sample solution is introduced into the holes of the synthetic resin 270 (the synthetic resin 270 becomes a synthetic resin 272 having holes into which the sample solution 241 (not illustrated in the drawing) which is a part of the sample solution has been introduced). Then, in the water absorption step described later, only the water contained in a sample solution 242 present on the synthetic resin 270 in the sample solution is absorbed by the super absorbent polymer 230, but the water contained in the sample solution 241 present in the holes of the synthetic resin 270 in the sample solution is not absorbed by the super absorbent polymer 230.

That is, the sample solution injection step serves as a step of injecting the sample solution into the cylinder 213 while holding a part (the sample solution 241) of the sample solution injected into the cylinder 213 as the extraction solution to be added in the extraction solution addition step described later, in the holes (the extraction solution holding part) included in the porous synthetic resin 270 accommodated in the bottom part 217 of the cylinder 213.

Figure 5C:
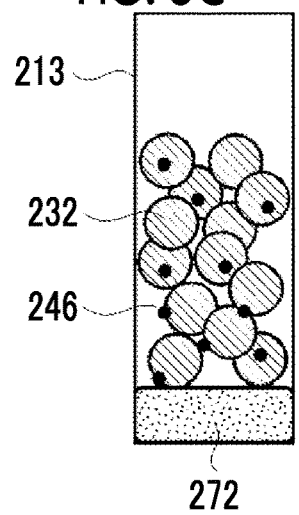
FIG. 5C is a view illustrating a water absorption step among schematic cross-sectional views illustrating one aspect of a sample solution concentration method using the aspect A2 of the concentration device according to the present invention in the order of steps.

Then, in the water absorption step, only the water contained in the sample solution 242 (the sample solution 242 other than the sample solution 241 held in the extraction solution holding part in the sample solution 240) present on the synthetic resin 270 in the sample solution 240 is absorbed by the super absorbent polymer 230, and the sample solution concentrate 246, which is a concentrate of the sample solution 242, is generated in the cylinder 213 (the super absorbent polymer 230 becomes a swollen super absorbent polymer 232) (FIG. 5C).

Figure 5D:
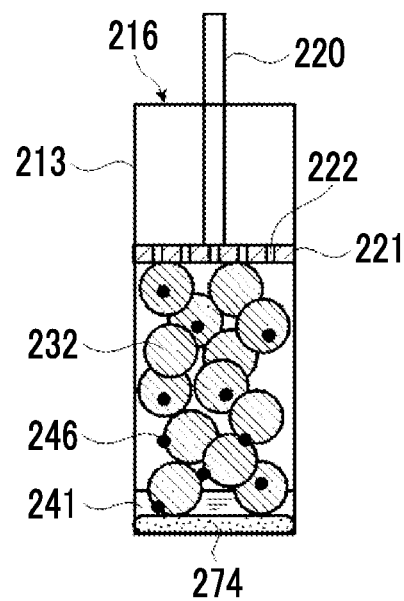
FIG. 5D is a view illustrating an extraction solution addition step among schematic cross-sectional views illustrating one aspect of a sample solution concentration method using the aspect A2 of the concentration device according to the present invention in the order of steps.

Next, in the extraction solution addition step, the synthetic resin 270 is crushed, and the sample solution 241 held in the extraction solution holding part is introduced above the synthetic resin 270 through the holes of the synthetic resin 270 to add the sample solution 241 held in the extraction solution holding part to the sample solution concentrate 246 (FIG. 5D). It is noted that in FIG. 5D, although the piston 220 to be used in the taking-out step described later is inserted into the cylinder 213 from the opening portion 216, and the super absorbent polymer 232 is pushed down to crush the synthetic resin 270, the method of crushing the synthetic resin 270 is not limited to this, and for example, a mechanism for crushing the synthetic resin 270 may be provided independently of the piston 220.

Figure 5E:
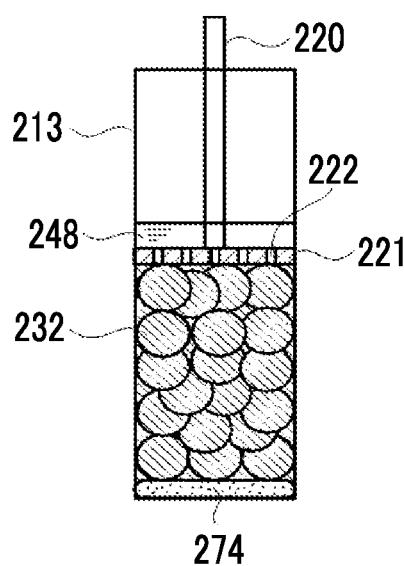
FIG. 5E is a view illustrating a taking-out step among schematic cross-sectional views illustrating one aspect of a sample solution concentration method using the aspect A2 of the concentration device according to the present invention in the order of steps.

Further, in the taking-out step, the piston 220 insertable into the cylinder 213 is inserted into the cylinder 213, where the piston 220 includes a tip part 221 having the holes 222 smaller than a particle diameter (a particle diameter of the swollen super absorbent polymer 232) of the super absorbent polymer 230 after water absorption, to take out the sample solution concentrated solution 248, which is a concentrated solution of the sample solution 240, through the holes 222 in the tip part 221 of the piston 220 (FIG. 5E).

[Sample Solution Injection Step]

The sample solution injection step is the same as the sample solution injection step of the sample solution concentration method using the aspect A1 except that the extraction solution holding part has the following configuration.

[Extraction Solution Holding Part]

The piston includes an extraction solution holding part.

The extraction solution holding part is a portion formed from pores included in a porous resin accommodated in the bottom part of the cylinder. The holes included the resin are smaller than the particle diameter of the super absorbent polymer before water absorption.

Therefore, the super absorbent polymer does not enter the resin.

<Resin>

As the resin, any resin that is present in nature or any synthetic resin can be used; however, from the viewpoint of the ease of molding and the possibility of mass production at a low cost, an aspect in which the resin is a synthetic resin is preferable.

The material of the synthetic resin is not particularly limited; however, specific examples thereof include polyvinyl alcohol (PVA).

Due to the reason that the effect and the like of the present invention are more excellent, the resin is preferably a sponge.

The holes in the resin are smaller than the particle diameter of the super absorbent polymer before water absorption. Therefore, the super absorbent polymer does not enter the resin.

The void ratio (the volume of the voids/the volume of the resin including the voids) of the resin is not particularly limited; however, it is preferably 50% or more, more preferably 70% or more and 99% or less, and still more preferably 70% or more and 98% or less, due to the reason that the effect and the like of the present invention are more excellent.

[Water Absorption Step]

The water absorption step is the same as the water absorption step of the sample solution concentration method using the aspect A1.

[Extraction Solution Addition Step]

As described above, the extraction solution addition step is a step of adding a sample solution held in the extraction solution holding part, to the sample solution concentrate generated in the water absorption step described above.

The extraction solution has a role of extracting (taking out) the sample solution concentrate generated in the water absorption step.

Examples of the method of adding the extraction solution include a method in which as described above, the piston to be used in the taking-out step described later is inserted into the cylinder from the opening portion, and the super absorbent polymer is pushed down to crush the porous resin, and a method in which a mechanism for crushing the porous resin is provided independently of the piston.

The proportion (the extraction solution/the sample solution) of the amount of the extraction solution (the sample solution held in the extraction solution holding part) with respect to the amount of the sample solution to be injected into the cylinder, is the same as that in the extraction solution addition step of the above-described sample solution concentration method using the aspect A1.

[Taking-Out Step]

The taking-out step is the same as the taking-out step of the sample solution concentration method using the aspect A1.

[6] Aspect B

An aspect B of the concentration device according to the embodiment of the present invention is a concentration device which is a concentration device for concentrating a sample solution which is an aqueous solution containing a high-molecular-weight molecule, the concentration device including a cylinder that accommodates a particulate super absorbent polymer and a piston that is insertable into the cylinder, the piston includes the tip part having holes smaller than the particle diameter of the super absorbent polymer after water absorption, the cylinder has a liquid holding part (hereinafter, also referred to as an "extraction solution holding part") for holding the sample solution present on a tip part of the piston in the sample solution injected into the cylinder, by fixing the tip part of the piston to a position (hereinafter, also referred to as a "position A") lower than a solution surface of the sample solution injected into the cylinder and higher than the super absorbent polymer accommodated in the cylinder, the super absorbent polymer is accommodated under the extraction solution holding part in the cylinder through the piston, the cylinder and the piston include a piston position fixing mechanism for fixing the tip part of the piston to the position against pressure associated with water absorption expansion of the super absorbent polymer, the super absorbent polymer absorbs the water contained in the sample solution other than the sample solution held in the extraction solution holding part, in the sample solution injected into the cylinder, to generate a sample solution concentrate which is a concentrate of the sample solution, in the cylinder, the piston position fixing mechanism is released, and the piston is pulled up to introduce a sample solution (hereinafter, also referred to as an "extraction solution") present on the tip part of the piston, below the tip part of the piston through holes in the tip part of the piston, whereby the sample solution present on the piston is added to the sample solution concentrate, and the piston is pulled down again into the cylinder to take out a sample solution concentrated solution, which is a concentrated solution of the sample solution, from the holes at the tip part of the piston.

The aspect B will be described with reference to the drawings.

Figure 3:
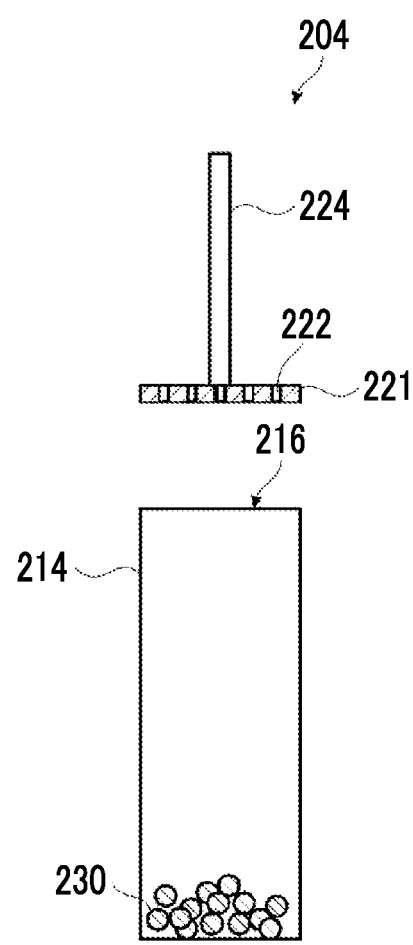
FIG. 3 is a schematic cross-sectional view illustrating one aspect of an aspect B of the concentration device according to the present invention.

FIG. 3 is a schematic cross-sectional view of one aspect of the aspect B.

As illustrated in FIG. 3, a concentration device 204 includes the cylinder 214 that accommodates the super absorbent polymer 230 and the piston 224 that is insertable into the cylinder 214. The piston 220 has holes smaller than the particle diameter of the super absorbent polymer 230 after water absorption. The piston 224 includes the tip part 221 having the holes 222 smaller than the particle diameter of the super absorbent polymer 230 after water absorption. The cylinder 214 and the piston 224 include a piston position fixing mechanism (not illustrated in the drawing) for fixing the tip part 221 of the piston 224 at a position A against pressure associated with the water absorption expansion of the super absorbent polymer 230.

In a case where the sample solution is injected into the cylinder 214, the sample solution present on the tip part 221 of the piston 220 in the sample solution injected into the cylinder 214 is held by fixing the tip part 221 of the piston 220 at the position A. That is, the cylinder 214 has an extraction solution holding part that holds a part of the sample solution injected into the cylinder 214.

Hereinafter, a sample solution concentration method using the aspect B will be described, and each member and the like constituting the aspect B will also be described.

[7] Sample Solution Concentration Method Using Aspect B

The sample solution concentration method in which the sample solution, which is an aqueous solution containing a high-molecular-weight molecule, is concentrated using the aspect B, is a sample solution concentration method including, in the following order;

a sample solution injection step of injecting the sample solution into the cylinder while holding a part of the sample solution injected into the cylinder, in the extraction solution holding part, a water absorption step in which water contained in the sample solution other than the sample solution held in the extraction solution holding part, in the sample solution injected into the cylinder, is absorbed by the super absorbent polymer accommodated in the cylinder, to generate the sample solution concentrate in the cylinder, a liquid addition step (hereinafter, also referred to as an "extraction solution addition step addition step") of adding the sample solution held in the extraction solution holding part to the sample solution concentrate, and a taking-out step of inserting, into the cylinder, the piston insertable into the cylinder and including a tip part having a hole smaller than a particle diameter of the super absorbent polymer after water absorption, to take out a sample solution concentrated solution, which is a concentrated solution of the sample solution, through the hole in the tip part of the piston, wherein the sample solution injection step is a step of injecting the sample solution into the cylinder while inserting the piston into the cylinder and fixing the piston at a position (the position A) lower than a solution surface of the sample solution injected into the cylinder and higher than the super absorbent polymer accommodated in the cylinder, to hold, in the cylinder, the sample solution present on the piston in the sample solution injected into the cylinder, as the extraction solution, and the extraction solution addition step is a step of pulling up the piston and introducing the sample solution present on the piston, below the piston through holes in the piston, to add the sample solution present on the piston to the sample solution concentrate.

The sample solution concentration method using the aspect B will be described with reference to the drawings.

FIG. 6 (FIG. 6A to FIG. 6E) are schematic cross-sectional views illustrating one aspect of the concentration method of the aspect B in the order of steps.

Figure 6A:
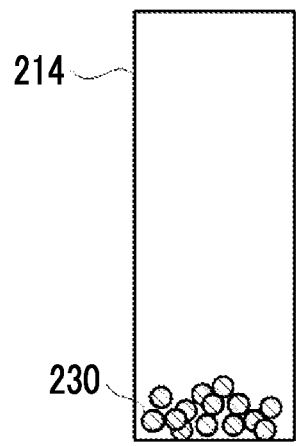
FIG. 6A is a view illustrating a first state among schematic cross-sectional views illustrating one aspect of a sample solution concentration method using the aspect B of the concentration device according to the present invention in the order of steps.
Figure 6B:
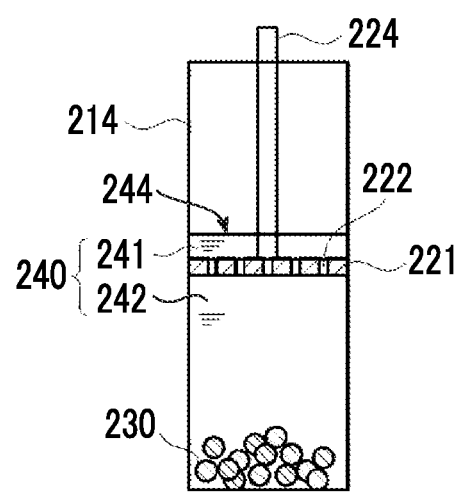
FIG. 6B is a view illustrating a sample solution injection step among schematic cross-sectional views illustrating one aspect of a sample solution concentration method using the aspect B of the concentration device according to the present invention in the order of steps.

First, in the sample solution injection step, the sample solution 240 is injected from the opening portion 216 into a cylinder 214 (FIG. 6A) in which the particulate super absorbent polymer 230 is accommodated, while a piston 224 insertable into the cylinder 214, the piston 224 including the tip part 221 having the holes 222 smaller than a particle diameter of the super absorbent polymer 230 after water absorption, is inserted into the cylinder 214, and the tip part 221 of the piston 224 is fixed at the position (the position A) lower than a solution surface 244 of the sample solution 240 injected into the cylinder 214 and higher than the super absorbent polymer 230 accommodated in the cylinder 214 (FIG. 6B). It is noted that the cylinder 214 and the piston 224 include a piston position fixing mechanism (not illustrated in the drawing) for fixing the tip part 221 of the piston 224 at a position A against pressure associated with the water absorption expansion of the super absorbent polymer 230.

In a case where the sample solution 240 is injected into the cylinder 214, while the piston 224 is inserted into the cylinder 214 to fix the tip part 221 of the piston 224 at the position A as described above, a part of the sample solution is introduced above the tip part 221 of the piston 224 through the holes 222 in the tip part 221 of the piston 224. Then, in the water absorption step described later, only the water contained in a sample solution 242 present under the tip part 221 of the piston 224 in the sample solution 240 is absorbed by the super absorbent polymer 230, but the water contained in the sample solution 241 present on the tip part 221 of the piston 224 in the sample solution 240 is not absorbed by the super absorbent polymer.

That is, the sample solution injection step serves as a step of inserting the piston 224 into the cylinder 214 and fixing the tip part 221 of the piston 224 at the position A to hold the sample solution 241 present on the tip part 221 of the piston 224 in the sample solution 240 injected into the cylinder 214, as the extraction solution to be added in the extraction solution addition step described later.

Figure 6C:
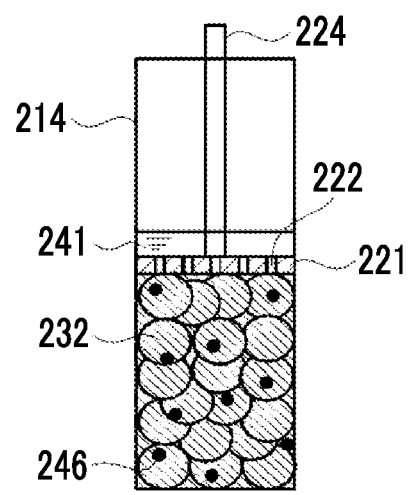
FIG. 6C is a view illustrating a water absorption step among schematic cross-sectional views illustrating one aspect of a sample solution concentration method using the aspect B of the concentration device according to the present invention in the order of steps.

Then, in the water absorption step, only the water contained in the sample solution 242 (the sample solution 242 other than the sample solution 241 held as the extraction solution in the sample solution 240) present under the tip part 221 of the piston 224 in the sample solution 240 is absorbed by the super absorbent polymer 230, and the sample solution concentrate 246, which is a concentrate of the sample solution 242, is generated in the cylinder 214 (the super absorbent polymer 230 becomes a swollen super absorbent polymer 232) (FIG. 6C).

Figure 6D:
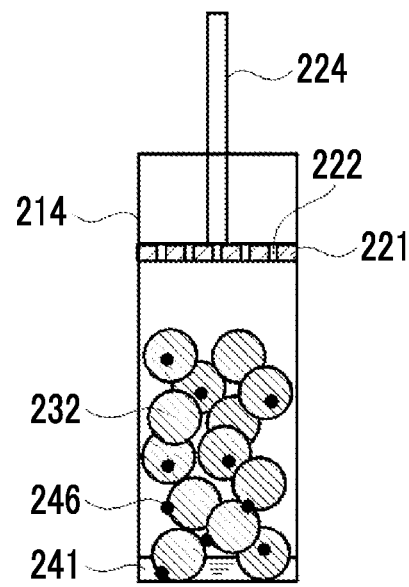
FIG. 6D is a view illustrating an extraction solution addition step among schematic cross-sectional views illustrating one aspect of a sample solution concentration method using the aspect B of the concentration device according to the present invention in the order of steps.

Next, in the extraction solution addition step, the piston 224 is pulled up, and the sample solution 241 present on the tip part 221 of the piston 224 is introduced below the tip part 221 of the piston 224 through holes 222 in the tip part 221 of the piston 224, whereby the sample solution 241 present on the tip part 221 of the piston 224 is added to the sample solution concentrate 246 (FIG. 6D).

Figure 6E:
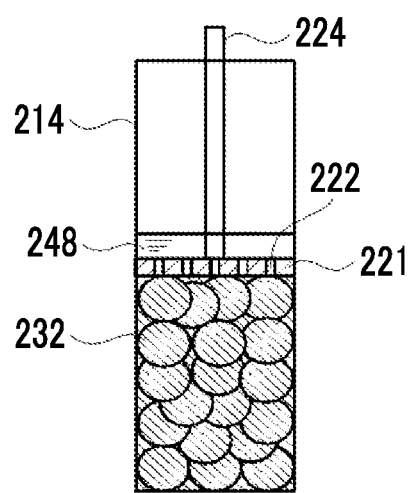
FIG. 6E is a view illustrating a taking-out step among schematic cross-sectional views illustrating one aspect of a sample solution concentration method using the aspect B of the concentration device according to the present invention in the order of steps.

Then, in the taking-out step, the piston 224 is inserted into the cylinder 214 to take out the sample solution concentrated solution 248, which is a concentrated solution of the sample solution 240, through the holes 222 in the tip part 221 of the piston 224 (FIG. 6E).

[Sample Solution Injection Step]

The sample solution injection step is the same as the sample solution injection step of the sample solution concentration method using the aspect A1 except that the extraction solution holding part has the following configuration.

[Extraction Solution Holding Part]

In a case where the sample solution is injected into the cylinder, the sample solution present on the tip part of the piston in the sample solution injected into the piston is held by fixing the tip part of the piston at the position A. That is, the cylinder has an extraction solution holding part that holds a part of the sample solution injected into the cylinder.

[Water Absorption Step]

The water absorption step is the same as the water absorption step of the sample solution concentration method using the aspect A1.

[Extraction Solution Addition Step]

As described above, the extraction solution addition step is a step of adding a sample solution held in the extraction solution holding part, to the sample solution concentrate generated in the water absorption step described above.

The extraction solution has a role of extracting (taking out) the sample solution concentrate generated in the water absorption step.

Examples of the method of adding the extraction solution include a method in which as described above, the piston is pulled up to introduce the sample solution present on the tip part of the piston, below the tip part of the piston through holes in the tip part of the piston.

The proportion (the extraction solution/the sample solution) of the amount of the extraction solution (the sample solution held in the extraction solution holding part) with respect to the amount of the sample solution to be injected into the cylinder, is the same as that in the extraction solution addition step of the above-described sample solution concentration method using the aspect A1.

[Taking-Out Step]

The taking-out step is the same as the taking-out step of the sample solution concentration method using the aspect A1.

[Piston Position Fixing Mechanism]

As described above, the aspect B includes a piston position fixing mechanism in which the cylinder and the piston fix the tip part of the piston at the position A described above against pressure associated with the water absorption expansion of the super absorbent polymer described above.

The piston position fixing mechanism is not particularly limited. However, examples thereof include such one as shown in Example 3 (FIG. 8) described later, in which the cylinder includes a notch, the piston has a protrusion, the piston is inserted into the cylinder, and the protrusion of the piston is hooked onto the notch of the cylinder, whereby the tip part of the piston can be fixed at the position A against pressure association with the water absorption expansion of the super absorbent polymer.

[8] Lid Having Recovery Port

Due to the reason that the effect and the like of the present invention are more excellent, the concentration device (the aspect A or the aspect B) according to the embodiment of the present invention preferably further includes a lid having a recovery port for recovering the sample solution concentrated solution described above.

Examples of the specific aspect of the lid include such a lid (FIG. 7) that is used in Example 1 described later.

[II] Sample Solution Concentration Method

The sample solution concentration method according to the embodiment of the present invention (hereinafter, also referred to as "the concentration method according to the invention") is as described above.

[III] Sample Solution Examination Method According to Embodiment of Present Invention The sample solution examination method according to the embodiment of the present invention (hereinafter, also referred to as "the examination method according to the invention") is a sample solution examination method in which a polymer is detected in a sample solution which is an aqueous solution containing a high-molecular-weight molecule, the sample solution examination method including, in the following order:

a concentration step of using the above-described sample solution concentration method according to the embodiment of the present invention to obtain the sample solution concentrated solution; and a detection step of detecting the high-molecular-weight molecule in the obtained sample solution concentrated solution.

In the examination method according to the embodiment of the present invention, since the high-molecular-weight molecule is detected using the sample solution concentrated solution obtained by the above-described concentration method according to the embodiment of the present invention, the high detection sensitivity can be obtained.

[Concentration Step]

The method of obtaining the sample solution concentrated solution using the concentration method according to the embodiment of the present invention is as described above.

[Detection Step]

The detection step is a step of detecting the high-molecular-weight molecule in the obtained sample solution concentrated solution.

Due to the reason that the effect and the like of the present invention are more excellent, the detection step is preferably a method using an antigen-antibody reaction, and examples thereof include an enzyme-linked immuno-sorbent assay (EIA), a solid phase enzyme-linked immuno-sorbent assay (ELISA), a radioimmunoassay (RIA), a fluorescent immunoassay (FIA), a Western blot method, and immunochromatography. Among the above, immunochromatography is preferable due to the reason that the effect and the like of the present invention are more excellent.

[Suitable Aspect]

Due to the reason that the effect and the like of the present invention are more excellent, the examination method according to the embodiment of the present invention is preferably an examination method in which the sample solution is an aqueous solution in which an antigen (a high-molecular-weight molecule) is containable, the concentration step is a step of using the above-described sample solution concentration method according to the embodiment of the present invention to concentrate an aqueous solution in which the antigen is containable, to obtain an antigen-concentrated solution (a sample solution concentrated solution), and the detection step is a step of detecting the antigen in the antigen-concentrated solution by immunochromatography using an antigen-antibody reaction.

Here, due to the reason that the effect and the like of the present invention are more excellent, the detection step preferably includes;

a spreading step of spreading gold particle composite bodies on an insoluble carrier having a reaction site at which a second binding substance capable of binding to an antigen in the antigen-concentrated solution has been immobilized, in a state where the gold particle composite bodies which are composite bodies of the antigen and modified gold particles which are gold particles modified with a first binding substance capable of binding to the antigen are formed, and a capturing step of capturing the gold particle composite bodies at the reaction site of the insoluble carrier.

Due to the reason that the effect and the like of the present invention are more excellent, the detection step preferably further includes a silver amplification step of silver-amplifying the gold particle composite body captured in the capturing step.

Here, due to the reason that the effect and the like of the present invention are more excellent, it is preferable that at least one of the first binding substance or the second binding substance is preferably a monoclonal antibody, and it is more preferable that both of the first binding substance and the second binding substance are a monoclonal antibody.

It is noted that the sample solution may contain impurities such as salts. For example, in a case where the sample solution is urine, it contains impurities of low-molecular-weight components, such as urea. From the studies by inventors of the present invention, it was found that in a case where these impurities are concentrated together with a high-molecular-weight molecule contained in the biological fluid, the antigen-antibody reaction may be inhibited and the detection sensitivity is decreased. That is, it is known that the effect of improving the detection sensitivity by concentration may not be sufficiently obtained.

Therefore, in the above-described concentration device according to the embodiment of the present invention which is used in the above-described concentration step, the swelling ratio of the super absorbent polymer is preferably in the above-described preferred range in which impurities and the like is capable of being sufficiently absorbed. Within the above range, these impurities are incorporated into the super absorbent polymer together with water, the above-described decrease in detection sensitivity hardly occurs, and as a result, it is conceived that extremely high detection sensitivity with respect to the high-molecular-weight molecule contained in the biological fluid is achieved.

Hereinafter, each step included in the above-described suitable aspect (hereinafter, also referred to as "the method according to the embodiment of the present invention") will be described.

[Spreading Step]

The spreading step is a step of spreading gold particle composite bodies on an insoluble carrier having a reaction site at which a second binding substance capable of binding to an antigen in the antigen-concentrated solution obtained in the above-described concentration step has been immobilized, in a state where the gold particle composite body which is a composite body of the antigen and the modified gold particle which is a gold particle modified with a first binding substance capable of binding to the antigen is formed.

<Gold Particle Composite Body>

As described above, in the spreading step, first, the gold particle composite body which is a composite body of the antigen in the antigen-concentrated solution obtained in the above-described concentration step and a modified gold particle which is a gold particle modified with a first binding substance capable of binding to the antigen is formed. It is noted that in a case where a composite body of the antigen in the sample solution and the labeled antibody is formed concurrently with the concentration of the sample solution, the antigen-concentrated solution may be simply spread, as it is, on the insoluble carrier.

(Modified Gold Particle)

The modified gold particle is a gold particle modified with the first binding substance capable of binding to an antigen.

(1) Gold Particle

The gold particle is not particularly limited; however, it is preferably a gold colloid particle due to the reason that the effect and the like of the present invention are more excellent.

In a case where the method according to the embodiment of the present invention includes a silver amplification step described later, the gold particle acts as a catalyst that reduces silver ions in the silver amplification step.

The particle diameter of the gold particles is preferably 500 nm or less, more preferably 300 nm or less, still more preferably 200 nm or less, and particularly preferably 100 nm or less, due to the reason that the effect and the like of the present invention are more excellent.

The lower limit of the particle diameter of the gold particles is not particularly limited; however, it is preferably 1 nm or more, more preferably 2 nm or more, and still more preferably 5 nm or more, due to the reason that the effect and the like of the present invention are more excellent.

The particle diameter can be measured with a commercially available particle diameter distribution meter or the like. As a method of measuring the particle diameter distribution, optical microscopy, confocal laser microscopy, electron microscopy, atomic force microscopy, static light scattering method, laser diffraction method, dynamic light scattering method, centrifugal sedimentation method, electric pulse measurement method, chromatography method, ultrasonic attenuation method, and the like are known, and apparatuses corresponding to the respective principles are commercially available. As the method of measuring a particle diameter, a dynamic light scattering method can be preferably used due to the particle diameter range and the ease of measurement. Examples of the commercially available measuring device using dynamic light scattering include NANOTRAC UPA (Nikkiso Co., Ltd.), a dynamic light scattering type particle diameter distribution measuring device LB-550 (HORIBA, Ltd.), and a Fiber-Optics Particle Analyzer FPAR-1000 (Otsuka Electronics Co., Ltd.). In the present invention, the average particle diameter is obtained as a value of a median diameter (d=50) measured at a measurement temperature of 25° C.

(2) First Binding Substance

The first binding substance is not particularly limited as long as it is capable of binding to the above antigen; however, due to the reason that the effect and the like of the present invention are more excellent, it is preferably a protein, more preferably an antibody (for example, a polyclonal antibody or a monoclonal antibody), and from the viewpoint of achieving higher detection sensitivity, it is still more preferably a monoclonal antibody.

The above antibody is not particularly limited. However, it is possible to use, for example, an antiserum prepared from a serum of an animal immunized with an antigen, or an immunoglobulin fraction purified from an antiserum. In addition, it is possible to use a monoclonal antibody obtained by cell fusion using spleen cells of an animal immunized with an antigen, or a fragment thereof [for example, $F(ab')_2$, Fab, Fab', or Fv]. The preparation of these antibodies can be carried out by a conventional method.

A commercially available antibody can be used as the first binding substance in a case where the antigen is an influenza virus, and examples thereof include an anti-influenza A type monoclonal antibody (Anti-Influenza A SPTN-5 7307, Medix Biochemica Inc.) and an anti-influenza A type monoclonal antibody (manufactured by BiosPacific, Inc., clone number: A60010044P).

In addition, in a case where the antigen is LAM, examples of the first binding substance include the A194-01 antibody described in WO2017/139153A. The entire content disclosed in WO2017/139153A relating to the A194-01 antibody is incorporated in the present specification as a part of the disclosure of the present specification.

In a case where the antigen is LAM, other examples of the first binding substance include the antibody having a sequence described as MoAb1 in paragraph No. [0080] of WO2013/129634A. The entire content disclosed in WO2013/129634A relating to the MoAb1 antibody is incorporated in the present specification as a part of the disclosure of the present specification.

(3) Method of Manufacturing Modified Gold Particle

The method of manufacturing the modified gold particle is not particularly limited, and a known method can be used.

Examples thereof include a chemical bonding method such as a method in which an SH group is introduced into an antibody, and the fact that gold and an SH group are chemically bonded is utilized so that the SH bond of the antibody is cleaved to generate an Au—S bond on the Au surface when the antibody approaches gold particles, whereby the antibody is immobilized.

<Insoluble Carrier>

The above-described insoluble carrier (the porous carrier) is an insoluble carrier having a reaction site (a test line) at which a second binding substance capable of binding to the antigen is immobilized. The insoluble carrier may have a plurality of test lines depending on the kinds of antigens (for example, a test line for an influenza A type virus and a test line for an influenza B type virus). In addition, the insoluble carrier may have a control line on the downstream side of the test line in order to check the spreading of the gold particle composite bodies. Further, in a case where a reducing agent solution is used in the silver amplification step described later, a coloring reagent immobilization line may be provided on the downstream side of the test line in order to detect the reducing agent solution.

Figure 9:
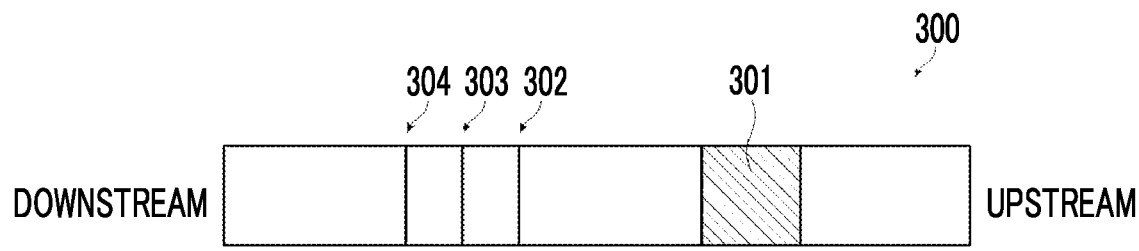
FIG. 9 is a schematic view of one aspect of an insoluble carrier that is used in a detection step of an examination method according to the present invention.

Examples of the specific aspect of the insoluble carrier include a nitrocellulose membrane 300 as illustrated in FIG. 9, which has from the upstream side; a gold colloid holding pad 301, a test line 302, a control line 303, and a coloring reagent immobilization line 304. Here, the gold colloid holding pad 301 is a pad that holds gold particles (modified gold particles) modified with the first binding substance, the test line 302 is a line on which the second binding substance is immobilized, the control line 303 is a line for checking the spreading, and the coloring reagent immobilization line 304 is a line for detecting the reducing agent solution described later. Here, the upstream side and the downstream side mean descriptions intended to indicate the spreading from the upstream side to the downstream side at the time when gold particle composite bodies are spread.

The more specific aspect of the insoluble carrier (or an immunochromatographic kit having the insoluble carrier) include, for example, the insoluble carrier or the immunochromatographic kit disclosed in JP5728453B, and the entire content of JP5728453B relating to the insoluble carrier and the immunochromatographic kit is incorporated in the present specification as a part of the disclosure of the present specification.

[Insoluble Carrier]

The insoluble carrier is preferably a porous carrier. In particular, due to the reason that the effect and the like of the present invention are more excellent, it is preferably a nitrocellulose film (a nitrocellulose membrane), a cellulose membrane, an acetyl cellulose membrane, a polysulfone membrane, a polyether sulfone membrane, a nylon membrane, a glass fiber, a non-woven fabric, a cloth, a thread, or the like is preferable, and a nitrocellulose film is more preferable.

(Second Binding Substance)

The second binding substance is not particularly limited as long as it is capable of binding to the above antigen.

The specific example and the suitable aspect of the second binding substance respectively include, for example, the same ones as the specific example and the suitable aspect described in the first binding substance described above. The second binding substance may be the same as or different from the above-described first binding substance; however, an aspect in which the second binding substance is a different substance is preferable due to the reason that the effect and the like of the present invention are more excellent.

In addition, in a case where the first binding substance and the second binding substance are antibodies, an aspect in which the antibody which is the first binding substance and the antibody which is the second binding substance are different from each other is preferable due to the reason that the effect and the like of the present invention are more excellent.

Further, in a case where the first binding substance and the second binding substance are antibodies, an aspect in which an epitope (a part of the antigen recognized by the first binding substance) of the first binding substance and an epitope (a part of the antigen recognized by the second binding substance) of the second binding substance are different from each other is preferable due to the reason that the effect and the like of the present invention are more excellent. The difference in epitope between antibodies can be confirmed by, for example, an enzyme-linked immunosorbent assay (ELISA).

<Spreading>

The method of spreading gold particle composite bodies on an insoluble carrier having a test line in a state where the gold particle composite bodies are formed is not particularly limited; however, examples thereof include a method in which the above nitrocellulose membrane 300 (or an immunochromatographic kit having the nitrocellulose membrane 300) as illustrated in FIG. 9 is prepared, and the antigen-concentrated solution obtained in the above-described concentration step is dropwise added onto a gold colloid holding pad and moved from the upstream side to the downstream side by using the capillary action as illustrated in FIG. 9.

[Capturing Step]

The capturing step is a step of capturing the gold particle composite bodies at the reaction site of the insoluble carrier.

As described above, since the second binding substance capable of binding to an antigen is immobilized at the reaction site of the insoluble carrier, the gold particle composite bodies (the composite bodies of an antigen and modified gold particles) spread on the insoluble carrier in the spreading step is captured at the reaction site (the test line) of the insoluble carrier.

The captured gold particle composite bodies are visible since it is colored by the surface plasmon or the like of a gold particle. In addition, it is also possible to estimate the concentration of the captured composite body using an image analysis device or the like. In this way, the antigen in the specimen can be detected.

In a case where a specimen does not contain an antigen, the gold particle composite bodies are not formed, and thus it is not captured at the reaction site of the insoluble carrier and coloration does not occur.

[Silver Amplification Step]

The silver amplification step is a step of silver-amplifying the gold particle composite body captured in the capturing step.

The silver amplification step is a step of forming large silver particles in the gold particle composite body captured at the reaction site of the insoluble carrier by providing silver ions to the insoluble carrier after the capturing step. More specifically, it is a step in which silver ions are reduced using gold particles of the gold particle composite body as a catalyst to form silver particles (for example, a diameter of 10 m or more).

This significantly improves the detection sensitivity of the captured gold particle composite body.

It is noted that the silver amplification step may be carried out together with the spreading step or the silver amplification step may also serve as the spreading step.

<Suitable Aspect>

The method of providing silver ions to the insoluble carrier after the capturing step is not particularly limited; however, it is preferably a method in which the following reducing agent solution and the following silver amplification solution are used, due to the reason that the effects and the like of the present invention are more excellent.

Further, in addition to the reducing agent solution and the silver amplification solution, a washing solution may be used to wash the composite body remaining on the insoluble carrier except for the specific binding reaction. The reducing agent solution may also serve as a washing solution.

(Reducing Agent Solution)

The reducing agent solution contains a reducing agent capable of reducing silver ions. As the reducing agent capable of reducing silver ions, any inorganic or organic material or a mixture thereof can be used as long as it can reduce silver ions to silver. Preferred examples of the inorganic reducing agent include a reducing metal salt and a reducing metal complex salt, of which the atomic valence is capable of being changed with a metal ion such as $Fe^{2+}$, $V^{2+}$, or $Ti^{3+}$. In a case where an inorganic reducing agent is used, it is necessary to remove or detoxify oxidized ions by complexing or reducing the oxidized ions. For example, in a system in which $Fe^{2+}$ is used as the reducing agent, a complex of $Fe^{3+}$, which is an oxide, is formed using citric acid or ethylenediaminetetraacetic acid (EDTA), and therefore detoxification is possible. In the present invention, it is preferable to use such an inorganic reducing agent, and as a more preferable aspect of the present invention, it is preferable to use a metal salt of $Fe^{2+}$ as the reducing agent.

It is also possible to use, as the reducing agent, a main developing agent (for example, methyl gallate, hydroquinone, substituted hydroquinone, 3-pyrazolidones, p-aminophenols, p-phenylenediamines, hindered phenols, amidoximes, azines, catechols, pyrogallols, ascorbic acid (or derivatives thereof), or leuco dyes) that is used in a wet-type light-sensitive silver halide photographic material, and other materials obvious to those who are skilled in the technology in the present field, such as a material disclosed in U.S. Pat. No. 6,020,117A.

As the reducing agent, an ascorbic acid reducing agent is also preferable. The useful ascorbic acid reducing agent includes ascorbic acid, an analog thereof, an isomer thereof, and a derivative thereof. Preferred examples thereof include D- or L-ascorbic acid and a sugar derivative thereof (for example, γ-lactoascorbic acid, glucoascorbic acid, fucoascorbic acid, glucoheptoascorbic acid, or maltoascorbic acid), a sodium salt of ascorbic acid, a potassium salt of ascorbic acid, isoascorbic acid (or L-erythroascorbic acid), a salt thereof (for example, an alkali metal salt, an ammonium salt, or a salt known in the related technical field), ascorbic acid of the enediol type, ascorbic acid of the enaminol type, ascorbic acid of the thioenol type. Particularly preferred examples thereof include D-, L-, or D,L-ascorbic acid (and an alkali metal salt thereof) or isoascorbic acid (or an alkali metal salt thereof), and a sodium salt is a preferred salt. A mixture of these reducing agents can be used as necessary.

Due to the reason that the effect and the like of the present invention are more excellent, the reducing agent solution is preferably allowed to flow so that the angle between the spreading direction in the spreading step and the spreading direction of the reducing agent solution is 0 degrees to 150 degrees, and more preferably allowed to flow so that the angle between the spreading direction in the spreading step and the spreading direction of the reducing agent solution is 0 degrees to 135 degrees.

Examples of the method of regulating the angle between the spreading direction in the spreading step and the spreading direction of the reducing agent solution include the method described in Examples of JP2009-150869A.

(Silver Amplification Solution)

The silver amplification solution is a solution containing a compound containing silver ions. As the compound containing silver ions, it is possible to use, for example, organic silver salts, inorganic silver salts, or silver complexes. Preferred examples thereof include silver ion-containing compounds having a high solubility in a solvent such as water, such as silver nitrate, silver acetate, silver lactate, silver butyrate, and silver thiosulfate. Silver nitrate is particularly preferable. The silver complex is preferably a silver complex in which silver is coordinated with a ligand having a water-soluble group such as a hydroxyl group or a sulfone group, and examples thereof include silver hydroxythioether.

As the silver, the organic silver salt, the inorganic silver salt, or the silver complex is preferably contained in the silver amplification solution at a concentration of 0.001 mol/L to 5 mol/L, preferably 0.005 mol/L to 3 mol/L, and more preferably 0.01 mol/L to 1 mol/L.

Examples of the auxiliary agent of the silver amplification solution include a buffer, a preservative such as an antioxidant or an organic stabilizer, and a rate regulating agent. As the buffer, it is possible to use, for example, a buffer formed of acetic acid, citric acid, sodium hydroxide, or one of salts of these compounds, or formed of tris(hydroxymethyl)aminomethane, or other buffers that are used in general chemical experiments. These buffers are appropriately used to adjust the pH of the amplification solution to an optimum pH thereof. In addition, as the antifogging agent, an alkyl amine can be used as an auxiliary agent, and dodecyl amine is particularly preferable. In addition, a surfactant can be used for the intended purpose of improving the solubility of this auxiliary agent, and $C_9H_{19}$—$C_6H_4$—O—$(CH_2CH_2O)_{50}H$ is particularly preferable.

Due to the reason that the effect and the like of the present invention are more excellent, the silver amplification solution is preferably allowed to flow from the direction opposite to the spreading direction in the spreading step described above and more preferably allowed to flow so that the angle between the spreading direction in the spreading step and the spreading direction of the silver amplification solution is 45 degrees to 180 degrees.

Examples of the method of regulating the angle between the spreading direction in the spreading step and the spreading direction of the silver amplification solution include the method described in Examples of JP2009-150869A.

[IV] Examination Kit

The examination kit according to the embodiment of the present invention is
   an examination kit for detecting a high-molecular-weight molecule in a sample solution which is an aqueous solution containing a high-molecular-weight molecule, the examination kit including;
   the above-described concentration device (the aspect A or the aspect B) according to the embodiment of the present invention, and
   a detection device for detecting a high-molecular-weight molecule in a sample solution concentrated solution obtained by the above-described sample solution concentration method according to the embodiment of the present invention.

[1] Concentration Device

The concentration device (the aspect A or the aspect B) according to the embodiment of the present invention is as described above.

[2] Detection Device

The detection device is preferably an immunochromatograph due to the reason that the effect and the like according to the embodiment of the present invention are more excellent.

Due to the reason that the effect and the like of the present invention are more excellent, the detection device is preferably is preferably a detection device that includes an examination strip including an insoluble carrier having an examination region for detecting the high-molecular-weight molecule contained in the biological fluid, a first pot and a second pot in which a first amplification solution and a second amplification solution for amplifying an examination signal in the examination region are enclosed respectively, and a housing case encompassing the examination strip, the first pot, and the second pot.

[Suitable Aspect]

Due to the reason that the effect and the like of the present invention are more excellent, the detection device is preferably an immunochromatographic kit for detecting a test substance (a high-molecular-weight molecule contained in a biological fluid) in a specimen solution (a sample solution), which is an immunochromatographic kit (hereinafter, also referred to as "the immunochromatographic kit according to the embodiment of the present invention" or simply "the immunochromatographic kit") including;

an examination strip including an insoluble carrier having an examination region of a test substance on which a specimen solution is spread, a first pot and a second pot each having one surface including a sheet member, in which a first amplification solution and a second amplification solution for amplifying a detection signal in the examination region are enclosed respectively, and a housing case encompassing the examination strip, the first pot, and the second pot, where the housing case is formed by including a lower case including an accommodating part in which the examination strip is disposed, an upper case joined to the lower case at a peripheral edge, and an intermediate member disposed between the upper case and the lower case, the intermediate member includes a breaking part that breaks the sheet member of the first pot, with the breaking part facing the sheet member of the first pot, and the upper case is formed by including a first convex deformation part that is deformed toward the first pot side by applying a pressing force to the portion facing the first pot from the outside and breaks the sheet member of the first pot by the breaking part of the intermediate member, and a second convex deformation part that is deformed toward the second pot side by applying a pressing force to the portion facing the second pot from the outside and breaks the sheet member of the second pot.

In the immunochromatographic kit according to the embodiment of the present invention, it is preferable that by applying a pressing force, the first convex deformation part moves the first pot to a position where the sheet member is broken by the breaking part of the intermediate member.

At this time, it is preferable that the upper case includes two protruding parts erected toward the first pot side, which abut on and moves the first pot in a case where a pressing force is applied to the first convex deformation part.

In the immunochromatographic kit according to the embodiment of the present invention, it is preferable that the first convex deformation part has a centrally symmetric chevron shape.

In addition, at this time, it is preferable that the two protruding parts are disposed symmetrically with respect to the top of the chevron shape.

Further, it is also preferable that the two protruding parts are formed independently with each other on the slope which sandwiches the chevron-shaped top.

In the immunochromatographic kit according to the embodiment of the present invention, in a case where the first convex deformation part includes the above-described two protruding parts, it is preferable that the two protruding parts are disposed symmetrical with respect to the center of the contact surface of the first pot.

In addition, it is preferable that each of the two protruding parts is disposed on the end part side from a position of half of the distance from the center to the end part of the contact surface of the first pot.

It is noted that in the present specification, the convex deformation part means that the convex deformation part is convex-shaped in a case of being viewed from the outside of the immunochromatographic kit, and that similarly, the chevron shape is chevron-shaped in a case of being viewed from the outside.

In the immunochromatographic kit according to the embodiment of the present invention, in a case of including the above-described two protruding parts, the first convex deformation part can be configured to move the first pot while the tip of each of the two protruding parts abuts on the first pot and is gradually displaced toward the end part side.

In the immunochromatographic kit according to the embodiment of the present invention, it is preferable that the bending elastic modulus of the material constituting the first convex deformation part is 50 MPa to 350 MPa.

In addition, it is preferable that the bending elastic modulus of the material constituting the upper case is 50 MPa to 350 MPa and the bending elastic modulus of the material constituting the lower case is 500 MPa to 900 MPa.

In the immunochromatographic kit according to the embodiment of the present invention, it is preferable that the upper case is formed by integrally forming the first convex deformation part and the second convex deformation part by injection molding.

In the immunochromatographic kit according to the embodiment of the present invention, the upper case is formed by including a first convex deformation part that is deformed toward the first pot side by applying a pressing force to the portion facing the first pot from the outside and breaks the sheet member of the first pot by the breaking part of the intermediate member, and a second convex deformation part that is deformed toward the second pot side by applying a pressing force to the portion facing the second pot from the outside and breaks the sheet member of the second pot, and in a case where a person applies a pressing force with a finger or the like to the two convex deformation parts to deform them, it is possible to break the sheet member of the pot, and it is possible to supply the amplification solution to the examination strip, and thus it is possible to normally carry out the amplification reaction without a dedicated analysis apparatus that requires a power source. Accordingly, the immunochromatographic kit according to the embodiment of the present invention is particularly useful in a case where a dedicated analysis apparatus is not provided or in a case of an emergency, a disaster, or the like in which an analysis apparatus cannot be used.

Hereinafter, the embodiment of the immunochromatographic kit according to the embodiment of the present invention will be described with reference to the drawings. However, the immunochromatographic kit according to the embodiment of the present invention is not limited thereto. It is noted that in order to facilitate visual recognition, the scale and the like of each of the components in the drawings are appropriately changed from those of the actual ones.

Figure 10:
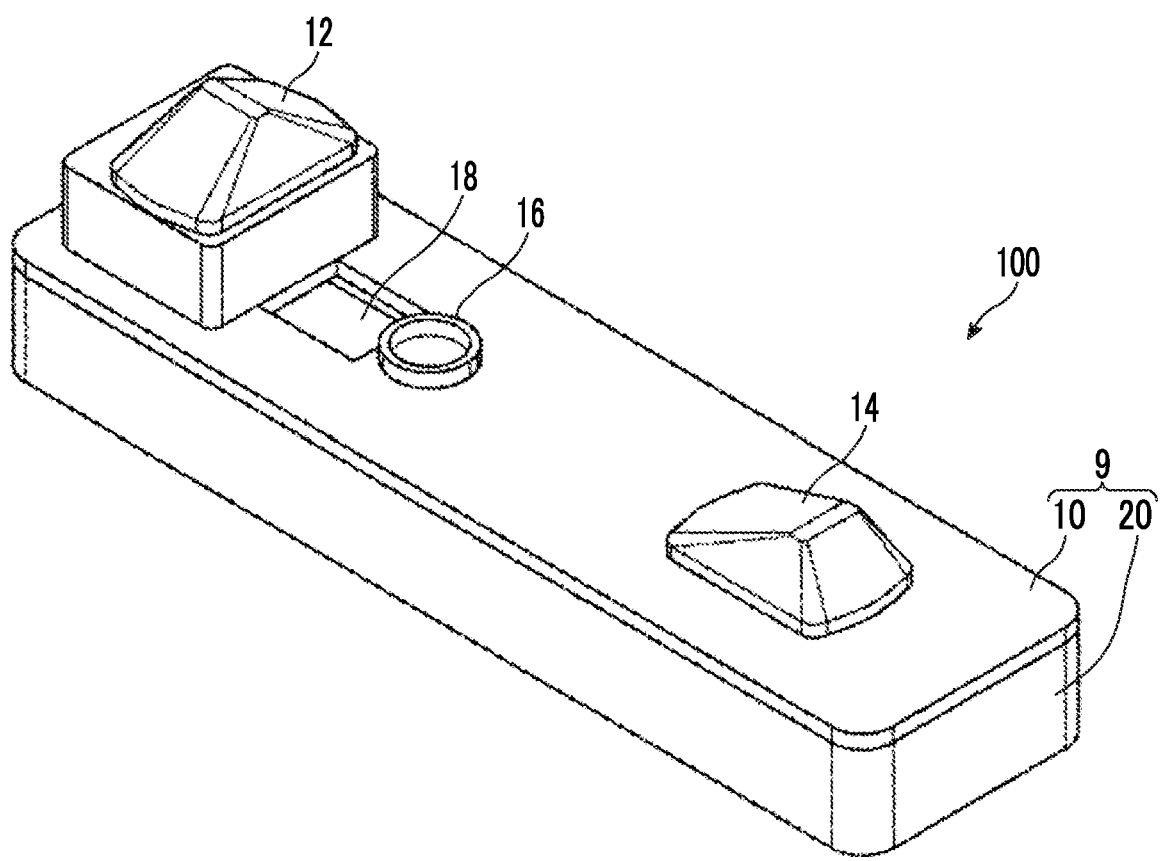
FIG. 10 is a perspective view illustrating an aspect of one embodiment of an immunochromatographic kit.
Figure 11:
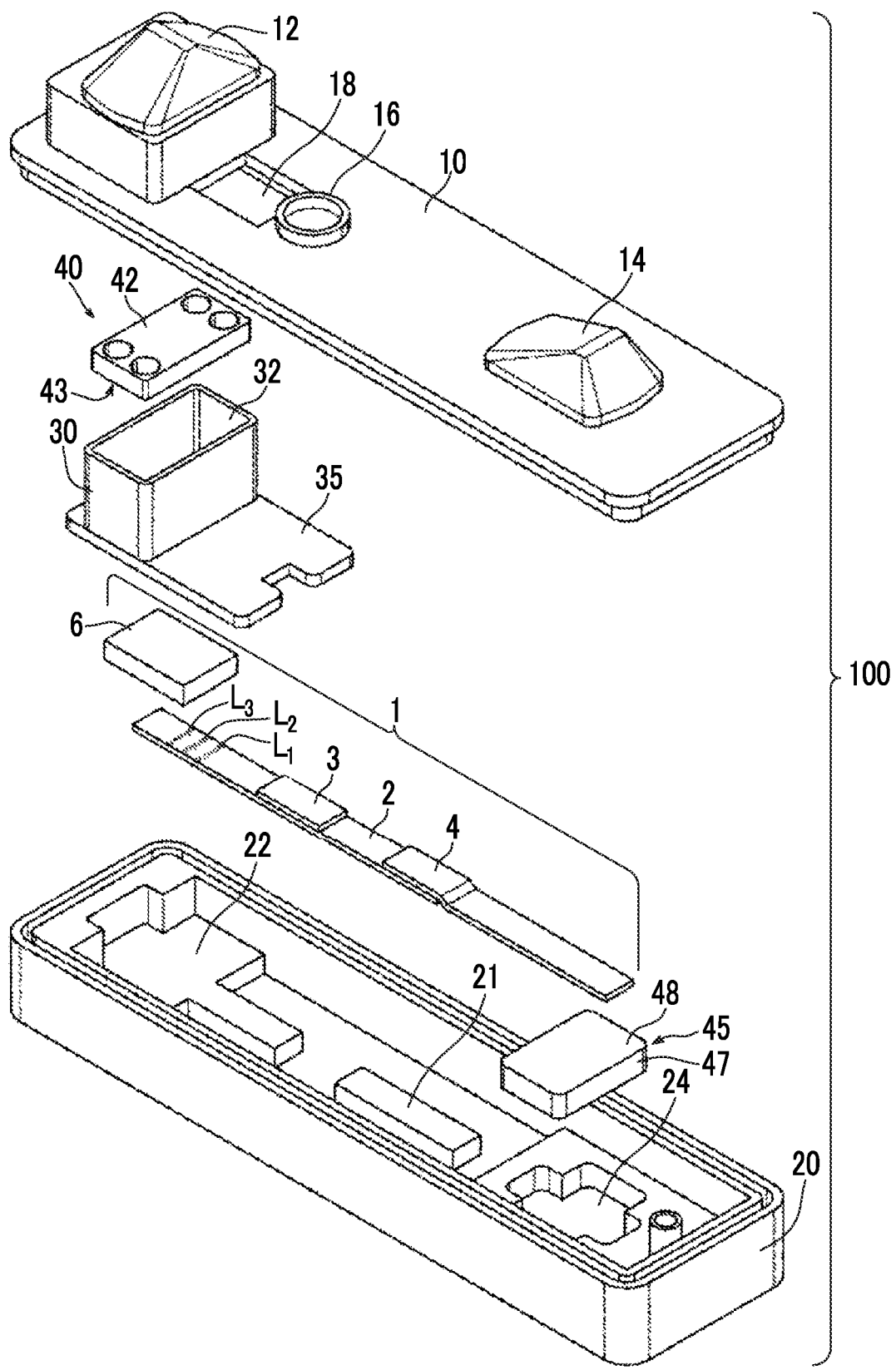
FIG. 11 is an exploded schematic perspective view illustrating an aspect of one embodiment of the immunochromatographic kit.

FIG. 10 is a schematic perspective view of an immunochromatographic kit 100 according to the embodiment of the present invention, and FIG. 11 is an exploded schematic perspective view of the immunochromatographic kit 100 of FIG. 10.

As illustrated in FIG. 10 and FIG. 11, the immunochromatographic kit 100 according to the embodiment of the present invention is formed such that a housing case 9 encompasses an examination strip 1 including an insoluble carrier 2 having an examination region of a test substance on which a specimen solution is spread, and a first pot 40 and a second pot 45 each having one surface including a sheet member, in which a first amplification solution 41 and a second amplification solution 46 for amplifying a detection signal in the examination region are enclosed respectively. The housing case 9 is formed by including a lower case 20 including an insoluble carrier accommodating part 21 in which the examination strip 1 is disposed, an upper case 10 joined to the lower case 20 at a peripheral edge, and an intermediate member 30 disposed between the upper case 10 and the lower case 20. It is noted that in the description of the immunochromatographic kit 100, the upper case 10 side is defined as the upper side, and the lower case 20 side is defined as the lower side.

The intermediate member 30 has a pot accommodating part 32 that accommodates the first pot 40 and includes, on the bottom surface, amplification solution filling holes for dropwise adding the first amplification solution 41 onto the insoluble carrier 2. In addition, a protrusion-shaped breaking part 34 that breaks a sheet member 43 is provided at a position in the first pot 40, facing the sheet member 43 in the pot accommodating part 32. In this example, the first pot 40 is disposed above the pot accommodating part 32 so that the surface of the first pot 40, on which the sheet member 43 is provided, is the lower surface, and the breaking part 34 is provided on the bottom surface of the pot accommodating part 32 facing the sheet member 43 (see FIG. 12).

In addition, a flow channel forming part 35 extending toward the downstream side of the bottom surface of the pot accommodating part 32 of the intermediate member 30 is provided. The flow channel forming part 35 is disposed to coincide with an upper position of an examination region $L_1$, a checking region $L_2$, and an amplification indicator region $L_3$, and it is formed of a transparent material in order to make these regions $L_1$ to $L_3$ visible.

The upper case 10 includes a first convex deformation part 12 that is deformed toward the first pot 40 side by applying a pressing force to the portion facing the first pot 40 from the outside and breaks the sheet member 43 of the first pot 40 by the breaking part 34 of the intermediate member 30. In addition, the upper case 10 includes a second convex deformation part 14 that is deformed toward the second pot 45 side by applying a pressing force to the portion facing a second pot 45 from the outside and breaks the sheet member 48 of the second pot 45.

In addition, the upper case 10 includes an opening pore 16 for dropwise addition of a specimen solution, and the specimen solution is dropwise added from the opening pore 16 for dropwise addition of a specimen solution onto a label holding pad 3 of the examination strip 1. In a case of adjusting the position of the label holding pad 3 so that the positions of the opening pore 16 for dropwise addition of a specimen solution and the label holding pad 3 match with each other, a specimen solution can be reliably spotted on the label holding pad 3. In addition, the upper case 10 includes an observation window 18 for visually recognizing the three regions $L_1$ to $L_3$, at a position corresponding to the flow channel forming part 35 of the intermediate member 30.

The lower case 20 includes, as an accommodating part in which the examination strip 1 is disposed, an insoluble carrier accommodating part 21 on which the insoluble carrier 2 is placed and an absorption pad accommodating part 22 on which an absorption pad 6 is placed downstream side of the insoluble carrier accommodating part 21. In addition, a second pot accommodating part 24 in which the second pot 45 is accommodated is provided on the upstream side of the insoluble carrier accommodating part 21.

Figure 12:
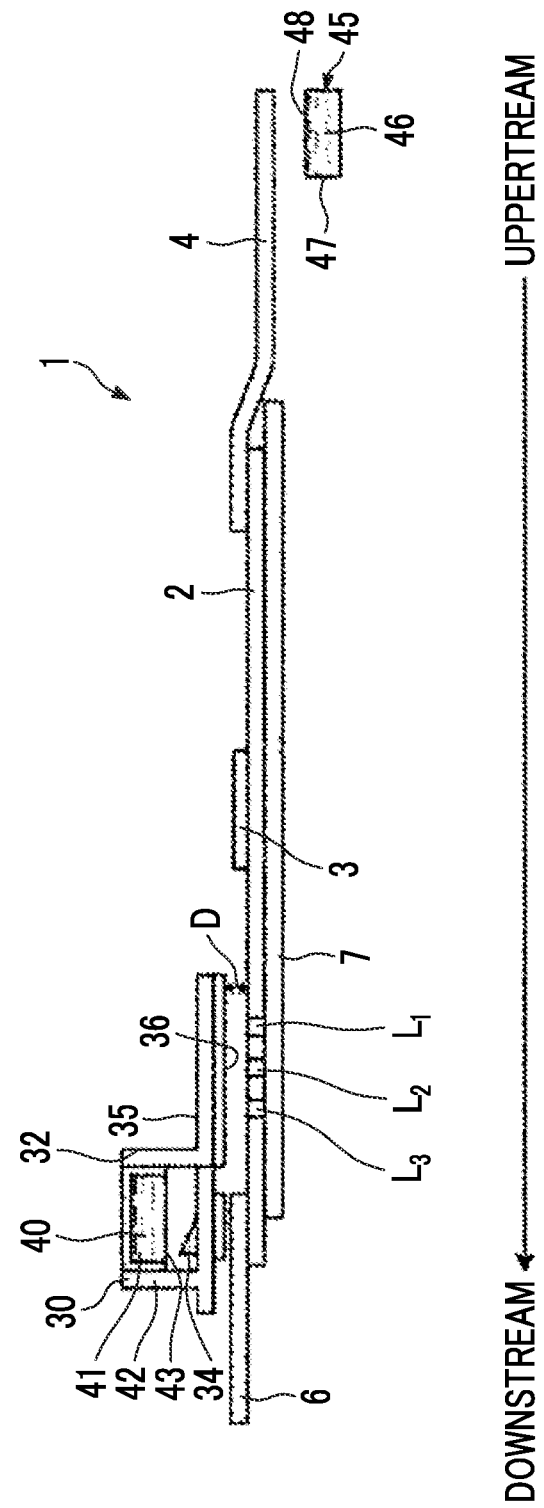
FIG. 12 is a schematic side view illustrating a positional relationship between an examination strip and a first and second pots.

FIG. 12 is a schematic cross-sectional view illustrating a positional relationship between the examination strip 1, the intermediate member 30, and the two pots 40 and 45. As illustrated in FIG. 12, the examination strip 1 includes the insoluble carrier 2 on which a specimen solution is spread, the label holding pad 3 that contains a labeling substance modified with a first substance that is capable of binding to a test substance immobilized on the insoluble carrier 2, a liquid feeding pad 4 that feeds the second amplification solution 46 disposed to be in contact with one end of the insoluble carrier 2 to the insoluble carrier 2, and the absorption pad 6 that is disposed to be in contact with the other end of the insoluble carrier 2. The insoluble carrier 2 is fixedly supported on a back pressure-sensitive adhesive sheet 7. In addition, the insoluble carrier 2 has, between the label holding pad 3 and the absorption pad 6, the examination region $L_1$ containing a second substance that binds to a test substance, the checking region $L_2$ containing a substance that is capable of binding to the first substance, and the amplification indicator region $L_3$ containing a substance that reacts with the second amplification solution, in the order from the label holding pad 3 side.

It is noted that in the present specification, the insoluble carrier 2 in which the examination region $L_1$, the checking region $L_2$, and the amplification indicator region $L_3$ are formed may be referred to as a chromatographic carrier. In addition, in the present specification, as described in FIG. 12, the liquid feeding pad 4 side is defined as the upstream side, and the absorption pad 6 side is defined as the downstream side.

The intermediate member 30 is positioned at an upper part on the downstream end side of the examination strip 1, and the first pot 40 is disposed in the pot accommodating part 32 of the intermediate member 30 with the sheet member 43 facing down. The second pot 45 is accommodated below the upstream end of the examination strip 1 of the lower case 20 with the sheet member 48 facing up.

As illustrated in FIG. 12, a gap (a clearance) D is formed between a back surface 36 of the flow channel forming part 35 of the intermediate member 30 and the insoluble carrier 2 of the examination strip 1. The gap D is preferably in a range of 0.01 mm to 1 mm. In a case where it is 0.01 mm or more, the amplification solution or the like can be sufficiently infiltrated, and in a case where it is 1 mm or less, the capillary force is exhibited, whereby the gap between the insoluble carrier 2 and the intermediate member 30 is uniformly filled with the first amplification solution 41.

In the first pot 40 in which the first amplification solution 41 is enclosed, a container 42 having an opening on one surface composed of, for example, a resin material is filled with the first amplification solution 41, and the opening of the container 42 is covered and enclosed by the breakable sheet member 43.

Similarly, in the second pot 45 in which the second amplification solution 46 is enclosed, a container 47 having an opening on one surface composed of, for example, a resin material is filled with the second amplification solution 46, and the opening of the container 47 is covered and enclosed by the breakable sheet member 48.

As the breakable sheet members 43 and 48 in the first pot 40 and the second pot 45, a laminated film such as an aluminum foil or an aluminum laminate sheet is suitably used. Here, "break" refers to a state where a member is not regenerated after being ruptured.

The convex deformation parts 12 and 14 at two places in the upper case will be described in detail.

Figure 13:
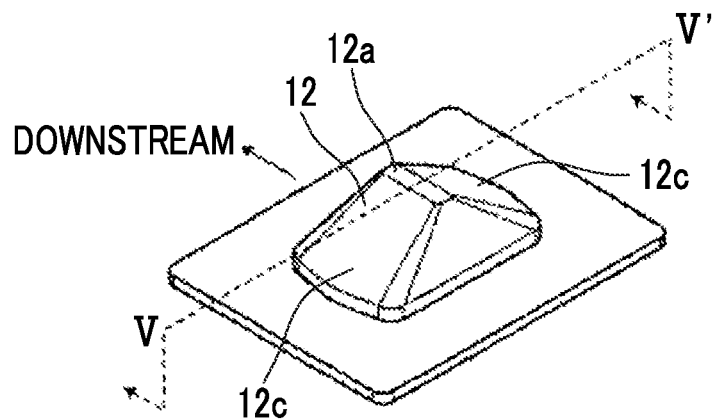
FIG. 13 is a perspective view of a first convex deformation part provided in an upper case of the immunochromatographic kit illustrated in FIG. 10.
Figure 14:
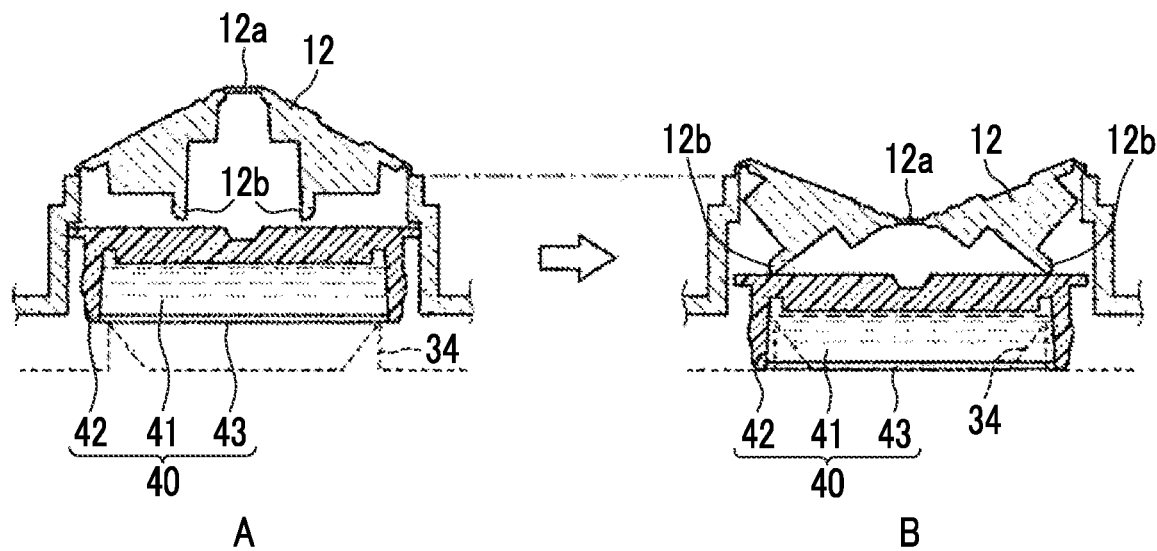
FIG. 14 is end views of a cut part cut along a V-V' line before and after the deformation of a first convex deformation part illustrated in FIG. 13.

FIG. 13 is a perspective view illustrating the first convex deformation part 12, and FIG. 14 is end views cut along a V-V' line of FIG. 13, where (A) of FIG. 14 illustrates the first convex deformation part 12 before the deformation, and (B) of FIG. 14 illustrates the first convex deformation part 12 after deformation, which are views illustrating a positional relationship with the first pot 40.

In a case of applying a pressing force, the first convex deformation part 12 moves the first pot 40 to a position where the sheet member 43 is broken by the breaking part 34 of the intermediate member 30. Specifically, the first convex deformation part 12 is configured to be pushed downward in a case of being depressed with a finger or the like, and it deforms the first convex deformation part 12 to be downwardly convex (to be recessed part-shaped in a case of being viewed from the outside), thereby moving the first pot 40 toward the breaking part 34 up to a position where the sheet member 43 of the first pot 40 is broken by the breaking part 34 in the pot accommodating part 32 of the intermediate member 30. As a result, the breaking part 34 can break through the sheet member 43 of the first pot 40 and can supply the first amplification solution 41 to the outside. The first amplification solution 41 is dropwise added onto the upper part of the insoluble carrier 2 from the amplification solution filling holes provided on the bottom surface of the pot accommodating part 32 of the intermediate member 30, whereby the first amplification solution 41 can be supplied to the examination region $L_1$, the checking region $L_2$, and the amplification indicator region $L_3$ on the insoluble carrier 2. It is noted that at this time, the gap between the intermediate member 30 and the insoluble carrier 2 is filled with the first amplification solution 41 dropwise added onto the upper part of the insoluble carrier 2 from the amplification solution filling holes, which subsequently passes through the gap and supplied above the examination region $L_1$, the checking region $L_2$, and the amplification indicator region $L_3$, and gradually permeate into the insoluble carrier 2.

As illustrated in FIG. 14, the first convex deformation part 12 includes two protruding parts 12b erected toward the first pot 40 at a position facing the first pot 40. In a case where a pressing force is applied to the first convex deformation part 12 to be deformed, the two protruding parts 12b is configured to abut on the first pot 40 to move the first pot 40.

The first convex deformation part 12 has a centrally symmetric chevron shape, and the two protruding parts 12b are disposed symmetrically with respect to a top 12a of the chevron shape and are formed independently with each other below (on the back surface) the slope 12c which sandwiches the top 12a.

In addition, as illustrated in (A) of FIG. 14, in the first convex deformation part 12 is formed, before the deformation, in the upper case 10 so that the two protruding parts 12b are positioned symmetrically with respect to the center of the contact surface of the first pot 40. In addition, the breaking part 34 of the intermediate member 30 is positioned below the sheet member 43 of the first pot 40, as indicated by a broken line in FIG. 14. In a case where a pressing force is applied to the first convex deformation part 12 to be deformed, the two protruding parts 12b moves the first pot 40 while the tip of each of the two protruding parts 12b abuts on the first pot 40 and is gradually displaced toward the end part side. Then, as illustrated in (B) of FIG. 14, the spacing between the two protruding parts 12b is widened after the first convex deformation part 12 is deformed, and the tips of the two protruding parts 12b are mutually to be positioned on the end part side from a position of half of the distance from the center to the end part of the contact surface of the first pot 40. In the present embodiment, the two protruding parts 12b are independently provided, a gap is provided between the protruding parts 12b (on the back surface of the top 12a), and the first convex deformation part 12 is formed of a flexible material, whereby the first pot 40 is depressed while greatly expanding the gap between the two protruding parts 12b.

The shape and disposition of the protruding parts 12b are not limited to the above-described forms, and the two protruding parts 12b may be provided, for example, before the deformation, at a position which is on the end part side from a position of half of the distance from the center to the end part of the contact surface of the first pot 40.

The first convex deformation part 12 that moves the first pot 40 can move the first pot 40 in parallel since it can evenly push the first pot 40 at two places in a case where the two protruding parts 12b are provided.

The first convex deformation part 12 is easily deformed in a case of being pressed with a finger or the like, and the first convex deformation part 12 becomes downwardly convex (recessed part-shaped). A configuration in which the recessed part shape does not return to the original shape after this pressing and the state where the first pot 40 is pressed can be maintained is preferable. Although the first convex deformation part 12 is configured to press the top 12a, the deformation is also similarly possible due to the elasticity of the first convex deformation part 12 by pressing the chevron-shaped slope.

Figure 15:
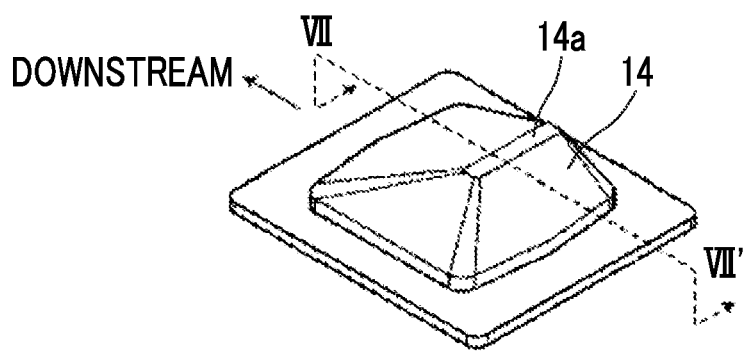
FIG. 15 is a perspective view of a second convex deformation part provided in an upper case of the immunochromatographic kit illustrated in FIG. 10.
Figure 16:
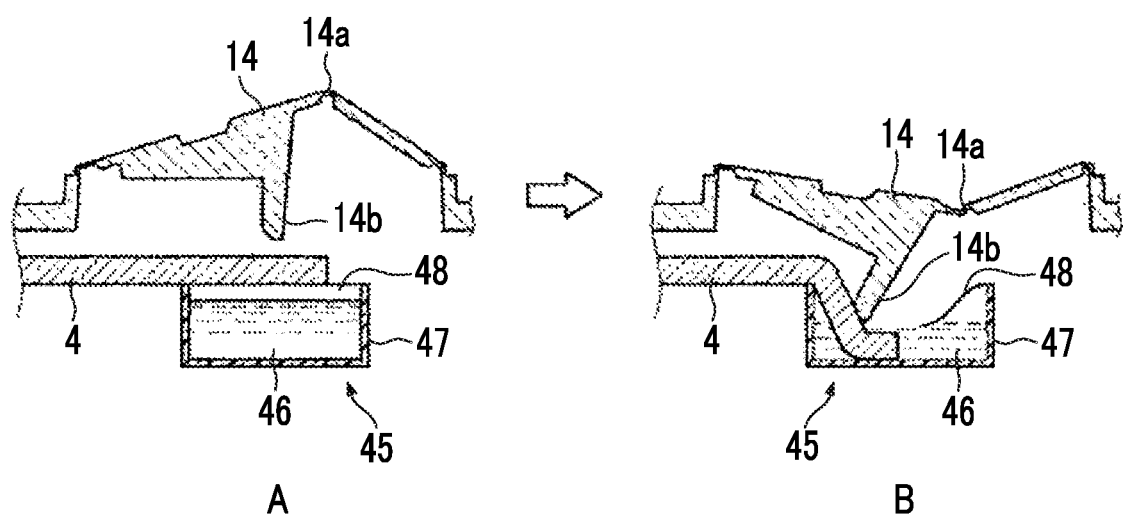
FIG. 16 is end views of a cut part cut along a VII-VII' line before and after the deformation of a second convex deformation part illustrated in FIG. 15.

FIG. 15 is a perspective view illustrating the second convex deformation part 14, and FIG. 16 is end views cut along a VII-VII' line of FIG. 15, where (A) of FIG. 16 illustrates the second convex deformation part 14 before the deformation, and (B) of FIG. 16 illustrates the second convex deformation part 14 after deformation, and which are views illustrating together a positional relationship with the second pot 45.

The second convex deformation part 14 breaks the sheet member 48 of the second pot 45 by applying a pressing force. As illustrated in (A) of FIG. 16, the second convex deformation part 14 includes one protruding part 14b erected toward the second pot 45 at a position facing the second pot 45. In addition, the liquid feeding pad 4 of the examination strip 1 is disposed between the second convex deformation part 14 and the second pot 45. A pressing force is applied to the second convex deformation part 14, whereby the second convex deformation part 14 is deformed into a convex shape on the second pot 45 side, that is, into a recessed part shape in a case of being viewed from the outside, and as illustrated in (B) of FIG. 16, the protruding part 14b abuts on the surface of the liquid feeding pad 4 to break through the sheet member 48 of the second pot 45, thereby pushing the liquid feeding pad 4 into the second pot 45. As illustrated in FIG. 16, the second convex deformation part 14 has a chevron shape having a top 14a on a slightly upstream side in the cross section along the direction from the upstream side to the downstream side, and it is configured such that at the time of deformation, the protruding part 14b tilts toward the downstream side to break through the sheet member 48.

By this operation, the liquid feeding pad 4 is immersed in the second amplification solution 46 in the second pot 45, and the second amplification solution 46 can permeate into the inside of the liquid feeding pad 4 by capillary action, thereby capable of being supplied to the insoluble carrier 2.

The second convex deformation part 14 is also easily deformed to be recessed part-shaped in a case of being pressed with a finger or the like. A configuration in which the recessed part shape does not return to the original shape after this pressing and the state where the liquid feeding pad 4 is pushed into the second pot 45 can be maintained is preferable.

The present invention realizes a highly sensitive analysis by deforming the first and second convex deformation parts to supply an amplification solution without using a device connected to a power source, where an aspect in which a person carries out the deformation by hand is assumed as one aspect. Accordingly, it is preferable to be designed so that the amplification solution does not accidentally leak to the outside, and it is preferable that the first and second convex deformation parts 12 and 14 which are provided in the upper case 10 are integrally formed without having gaps with other portions of the upper case 10. It is preferable that the convex deformation parts 12 and 14 are made of a stretchable material and are joined to other portions of the upper case 10 in a sealed state. The first and second convex deformation parts 12 and 14 of the upper case 10 and the other portions may be separately produced and then joined to each other. However, it is preferable that the first and second convex deformation parts 12 and 14 are integrally formed by injection molding, as a part of the upper case 10, as one continuous member having no joining portion in the middle.

The first and second convex deformation parts 12 and 14 need to have flexibility such that they can be easily deformed with a human finger or the like. The bending elastic modulus of the material constituting the convex deformation parts 12 and 14 is preferably 50 MPa or more and 350 MPa or less, and more preferably 70 MPa or more and 150 MPa or less.

In addition, in a case where the upper case 10 and the lower case 20 are simply fitted to each other in a case where they are combined, a liquid may leak from the gap, and thus it is preferable that the fitting portion between the upper case 10 and the lower case 20 is also adhered in a sealed state.

As a method of carrying out adhesion between the upper case 10 and the lower case 20, an ultrasonic welding method is preferably used. In general, it is known that welding is difficult to be carried out by ultrasonic welding unless the welding members are made of the same material, and the following combination of the upper case and the lower case is good; polyethylene/polyethylene, polypropylene/polypropylene, or ABS (an acrylonitrile-butadiene-styrene copolymer)/ABS.

On the other hand, in a case where the convex deformation parts 12 and 14 are integrally molded to the upper case 10, it is required that the material constituting the upper case 10 has flexibility. On the other hand, the lower case 20 is preferably rigid in order to fix the examination strip 1 or the second pot 45. Specifically, the bending elastic modulus of the material constituting the upper case 10 is preferably 50 MPa or more and 350 MPa or less, and more preferably 70 MPa or more and 150 MPa or less. The bending elastic modulus of the material constituting the lower case 20 is preferably 500 MPa or more and 900 MPa, and particularly preferably 650 MPa or more and 750 MPa or less.

It is noted that the bending elastic modulus is a value calculated according to Expression (1) as follows in an environment of a temperature of 20° C. according to the measuring method of ISO178 standard.

A plate-shaped test piece having a width b (mm) and a thickness h (mm) is prepared for a material for which the bending elastic modulus is to be measured, and the test piece is supported by two fulcrums where the distance between the fulcrums is L (mm). A load of F (N) is applied to the center between the fulcrums, and the amount of deflection (mm) in the direction in which the load is applied is measured. A deflection-load curve is created, where the horizontal axis indicates the deflection S (mm) and the vertical axis indicates the load F (N). A tangent line at the origin of this curve is determined, and a slope thereof (($\Delta F/\Delta S$) in a case where the amount of change in load is denoted by $\Delta F$ (N) and the amount of change in deflection is denoted by $\Delta S$ (mm)) is calculated whereby the bending elastic modulus E (MPa) can be calculated by using the following expression.

$$\text{Bending elastic modulus } E=(L^3/(4bh^3))\times(\Delta F/\Delta S) \qquad \text{Expression (1)}$$

Accordingly, the combination of the upper case and the lower case is most preferably a combination of polypropylene containing a softening agent and polypropylene. Here, the softening agent that is used in the polypropylene containing a softening agent is preferably an olefin-based elastomer, where the concentration of the olefin-based elastomer with respect to polypropylene is preferably 20% by mass or more and 60% by mass or less, and particularly preferably 40% by mass or more and 55% by mass or less. Specific examples of the softening agent include TAFTHREN (registered trade name) manufactured by Sumitomo Chemical Co., Ltd.

It is noted that the immunochromatographic kit according to the embodiment of the present invention only needs to have two or more convex deformation parts, and in a case where there are three or more kinds of solutions to be supplied to the examination strip, three or more convex deformation parts may be correspondingly provided.

As the insoluble carrier (the porous carrier) 2, for example, a nitrocellulose membrane or the like can be used. In addition, the back pressure-sensitive adhesive sheet 7 on which the insoluble carrier 2 is fixed is a sheet-shaped base material on which a surface to which the insoluble carrier 2 is attached is a pressure-sensitive adhesive surface.

The label holding pad 3 is fixed at a central portion of the insoluble carrier 2 in the longitudinal direction. As the labeling substance, it is possible to use, for example, a gold colloid having a diameter of 50 nm (EM. GC50, manufactured by BBI Solutions Inc.). In a case of modifying the surface of the labeling substance with a substance that binds to a test substance, it is possible to form a conjugate with the test substance.

The labeling substance is not limited to the above, and a metal sulfide that can be used in a general chromatograph method, coloring particles that are used in an immunoagglutination reaction, or the like can be used, where a metal colloid is particularly preferable. Examples of the metal colloid include a gold colloid, a silver colloid, a platinum colloid, an iron colloid, an aluminum hydroxide colloid, and a composite colloid thereof. In particular, at an appropriate particle diameter, a gold colloid is preferable since it exhibits a red color, and a silver colloid is preferable since it exhibits a yellow color, among which a gold colloid is most preferable.

In a case where a specimen solution to be dropwise added is prepared in advance by undergoing a step of causing a substance that binds to a test substance on the surface of the labeling substance to bind to the test substance in the specimen solution, an aspect in which the label holding pad 3 does not contain a labeling substance is preferable. In this case, the label holding pad 3 functions as a pad that indicates a position where the specimen solution containing a labeling substance is dropwise added.

It is noted that the examination strip 1 is positioned such that the position of the opening pore 16 for dropwise addition of a specimen solution of the upper case 10 and the position of the label holding pad 3 match with each other.

The examination region $L_1$ is a labeling substance capturing region which contains the second substance that binds to a test substance and in which the labeling substance that has bound to the test substance is captured through the test substance. For example, in a case where it is desired to detect an influenza A type virus or a biomarker thereof as a test substance, an aspect in which the examination region $L_1$ is constituted by an antibody immobilization line on which, for example, an anti-influenza A type monoclonal antibody (Anti-influenza A SPTN-5 7307, manufactured by Medix Biochemica) has been immobilized in a line shape by physical adsorption is preferable.

In a case where a composite body in which the test substance binds to the labeling substance through the first substance reaches the examination region $L_1$, the second substance specifically binds to the test substance, whereby the labeling substance is captured through the test substance and the first substance. On the other hand, the labeling substance that does not constitute the composite body with the test substance passes through the examination region $L_1$ without being captured.

The checking region $L_2$ is a region for checking the completion of the spreading of the specimen solution, which contains a substance that is capable of binding to the first substance, the substance being spread in the insoluble carrier 2 together with the specimen solution from the label holding pad 3, and in which the labeling substance that has passed through the examination region $L_1$ is captured through the first substance. For example, in a case where it is desired to detect an influenza A type virus or a biomarker thereof as a test substance, an aspect in which for example, an anti-mouse IgG antibody (Anti-mouse IgG (H+L), rabbit F(ab')$_2$, product number: 566-70621, manufactured by FUJIFILM Wako Pure Chemical Corporation) is immobilized in a line shape by physical adsorption is preferable.

The amplification indicator region $L_3$ is a region that serves as an indicator of the timing of the dropwise addition of the first amplification solution 41, which contains a substance that reacts with the second amplification solution 46, the substance reacting with the second amplification solution 46 to develop a color or change a color, thereby indicating that the second amplification solution 46 has been spread to the amplification indicator region $L_3$. For example, in a case where a mixed aqueous solution of an iron nitrate aqueous solution and citric acid (manufactured by Fujifilm Wako Pure Chemical Corporation, 038-06925) is used as the second amplification solution, an aspect in which the amplification indicator region $L_3$ is constituted by a coloring reagent immobilization line on which Bromocresol Green (manufactured by FUJIFILM Wako Pure Chemical Corporation) has been immobilized in a line shape is preferable. At this time, in a case where the second amplification solution 46 reaches the amplification indicator region $L_3$, the region $L_3$ changes from a green color to an orange color. This discoloration can be regarded as an indicator that the examination region $L_1$ and the checking region $L_2$ are sufficiently filled with the second amplification solution 46.

As a method of amplifying a signal of a metal-based labeling substance such as a metal colloid, it is preferable to use a method (hereinafter, silver amplification) in which silver ions and a reducing agent for silver ions are brought into contact with a labeling substance, the silver ions are reduced by the reducing agent to generate silver particles, and the silver particles are deposited on the labeling substance with the labeling substance as a nucleus.

In order to realize the silver amplification, a solution containing silver ions may be used as the first amplification solution 41, and a reducing agent solution containing a reducing agent for silver ions may be used as the second amplification solution 46.

(First Amplification Solution)

The solution containing silver ions, which is used as the first amplification solution 41, is preferably a solution obtained by dissolving a silver ion-containing compound in a solvent. As the compound containing silver ions, it is possible to use, for example, an organic silver salt, an inorganic silver salt, or a silver complex. It is preferably an inorganic silver salt or a silver complex. As the inorganic silver salt, it is possible to use a silver ion-containing compound having a high solubility in solvents such as water, and examples thereof include silver nitrate, silver acetate, silver lactate, silver butyrate, and silver thiosulfate. Silver nitrate is particularly preferable. The silver complex is preferably a silver complex in which silver is coordinated with a ligand having a water-soluble group such as a hydroxyl group or a sulfone group, and examples thereof include silver hydroxythioether.

(Second Amplification Solution)

As the reducing agent that is used in the reducing agent solution containing a reducing agent capable of reducing silver ions, where the reducing agent solution is used as the second amplification solution 46, any inorganic or organic material or a mixture thereof can be used as long as it can reduce silver ions to silver. Preferred examples of the inorganic reducing agent include a reducing metal salt and a reducing metal complex salt, of which the atomic valence is capable of being changed with a metal ion such as $Fe^{2+}$, $V^{2+}$, or $Ti^{3+}$. In a case where an inorganic reducing agent is used, it is necessary to remove or detoxify oxidized ions by complexing or reducing the oxidized ions. For example, in a system in which $Fe^{2+}$ is used as the reducing agent, a complex of $Fe^{3+}$, which is an oxide, is formed using citric acid or ethylenediaminetetraacetic acid (EDTA), which enables the detoxification. In this system, it is preferable to use such an inorganic reducing agent, where more preferably, a metal salt of $Fe^{2+}$ is preferable.

It is also possible to use a main developing agent used in a light-sensitive silver halide photographic material of a wet-type (such as methyl gallate, hydroquinone, substituted hydroquinone, 3-pyrazolidones, p-aminophenols, p-phenylenediamines, hindered phenols, amidoximes, azines, catechols, pyrogallols, ascorbic acid (or derivatives thereof), and leuco dyes), and other materials obvious to those who are skilled in the related art in the present field, such as a material disclosed in U.S. Pat. No. 6,020,117A.

As the reducing agent, an ascorbic acid reducing agent is also preferable. The useful ascorbic acid reducing agent includes ascorbic acid, an analogue thereof, an isomer thereof, and a derivative thereof. Preferred examples thereof include D- or L-ascorbic acid and a sugar derivative thereof (for example, γ-lactoascorbic acid, glucoascorbic acid, fucoascorbic acid, glucoheptoascorbic acid, or maltoascorbic acid), a sodium salt of ascorbic acid, a potassium salt of ascorbic acid, isoascorbic acid (or L-erythroascorbic acid), a salt thereof (for example, an alkali metal salt, an ammonium salt, or a salt known in the related technical field), ascorbic acid of the enediol type, ascorbic acid of the enaminol type, ascorbic acid of the thioenol type. Particularly preferred examples thereof include D-, L-, or D,L-ascorbic acid (and an alkali metal salt thereof) or isoascorbic acid (or an alkali metal salt thereof), and a sodium salt is a preferred salt. A mixture of these reducing agents can be used as necessary.

It is noted that in the present embodiment, although the first convex deformation part 12 is configured to move the first pot 40 toward the breaking part 34 provided in the intermediate member 30, the first convex deformation part 12 may be configured such that the sheet member 43 of the first pot 40 can be broken by the breaking part 34 in association with the deformation of the first convex deformation part 12.

The configuration of the pot accommodating part 32 accommodating the first pot 40 and the first pot 40 is not limited to the configuration of the present embodiment either as long as it is a configuration in which the first amplification solution 41 that flows out of the first pot 40 by the sheet member 43 of the first pot 40 being broken can be dropwise added onto the insoluble carrier 2 from the amplification solution filling holes on the bottom surface of the pot accommodating part 32.

In addition, it is preferable that there are two or more protruding parts of the first convex deformation part, since the first pot 40 can be moved in parallel without being tilted. However, the first convex member may have a form in which one protruding part having the same shape as the second convex deformation part of the above embodiment is provided. The convex deformation part having the same shape as the second convex deformation part may be used as the first convex deformation part that moves the first pot 40.

Figure 17:
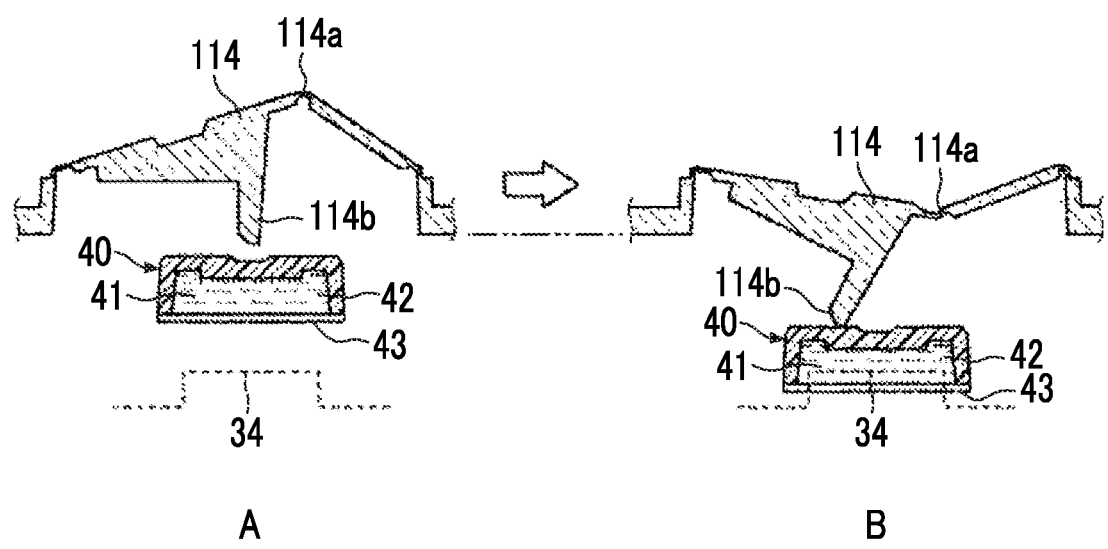
FIG. 17 is end views of a cut part before and after the deformation of a convex deformation part in a design modification example.

FIG. 17 is a cut end view similar to FIG. 16 illustrating a form in which the convex deformation part 114 having the same shape as the second convex deformation part is used for moving the first pot 40.

As illustrated in (A) of FIG. 17, before the deformation, the first pot 40 is disposed to be positioned below the protruding part 114b of the convex deformation part 114. In addition, the breaking part 34 of the intermediate member 30 is positioned below the first pot 40. In a case of depressing the top 114a of the convex deformation part 114, the protruding part 114b presses against the upper surface of the first pot 40 and pushes down the first pot 40. As a result, the breaking part 34 breaks through the sheet member 43 of the first pot 40, and the first amplification solution 41 enclosed in the first pot 40 flows out of the first pot and is supplied to the examination strip 1.

In this way, the pot can be moved even in a case where there is only one protruding part provided in the convex deformation part 114.

It is noted that the immunochromatographic kit according to the present invention may include a set of equipment or a part thereof necessary for an examination, such as a kit that encompasses a pot containing a sample extraction solution containing an auxiliary agent that assists the extraction of the sample or a pot containing a sample diluent, a desiccant or an oxygen scavenger, which assists the storage of the kit, an attached document such as an instruction manual, and a sample collection instrument such as a cotton swab.

In a case of using the immunochromatographic kit according to the embodiment of the present invention, it is possible to carry out an examination with high accuracy by the kit itself without using a dedicated analysis apparatus or the like.

<Immunochromatographic Examination Method>

An immunochromatographic examination method using the immunochromatographic kit 100 will be briefly described.

A specimen solution is dropwise added onto the label holding pad 3 from the opening pore 16 for dropwise addition of a specimen solution. In a case where the test substance is contained in the specimen solution, a composite body of the test substance and the labeling substance is formed through the first substance by binding the test substance to the first substance in the label holding pad 3, and this composite body is spread together with the specimen solution toward the absorption pad 6 side by capillary action due to the suction force of the absorption pad 6. In a case where a composite body of the test substance and the labeling substance in the specimen solution is formed in advance, an aspect in which the label holding pad 3 does not contain a labeling substance is preferable, and the composite body formed in advance is spread toward the absorption pad 6. Simultaneously with or after the dropwise addition of this specimen solution, the second convex deformation part 14 is depressed to displace the liquid feeding pad 4, thereby breaking the sheet member 48 of the second pot 45, and the liquid feeding pad 4 is immersed in the second amplification solution 46 to send the second amplification solution 46 to the insoluble carrier 2. It is noted that the timing of depressing the second convex deformation part 14 is preferably within 30 seconds from the time of the dropwise addition of the specimen solution, and particularly preferably immediately after the dropwise addition of the specimen solution.

The composite body that has reached the examination region $L_1$ binds to the second substance in the examination region $L_1$, thereby being captured. In addition, the first substance that does not bind to the test substance passes through the examination region $L_1$, reaches the checking region $L_2$, and binds to the substance that binds to the first substance in the checking region $L_2$, thereby being captured.

The second amplification solution 46 goes through the examination region $L_1$ and the checking region $L_2$ and reaches the amplification indicator region $L_3$. At this time, the amplification indicator region $L_3$ is discolored, whereby the arrival of the second amplification solution 46 at the amplification indicator region $L_3$ can be visually recognized. After the checking of the discoloration of the amplification indicator region $L_3$, the first convex deformation part 12 is depressed to supply the first amplification solution 41 onto the insoluble carrier 2.

After the first amplification solution 41 is supplied to the insoluble carrier 2, the reaction is waited for completion, and then the color development of the examination region $L_1$ and the checking region $L_2$ is checked through the observation window 18. It is possible to check the presence or absence of the test substance and the highness or lowness of the concentration thereof by the color development of the examination region $L_1$, and it is possible to check whether or not the examination for measuring the test substance is successful, by the color development of the checking region $L_2$. The color development in the examination region $L_1$ and the checking region $L_2$ is obtained by amplifying the signal of the label, and a highly sensitive examination can be realized.

EXAMPLES

Hereinafter, the present invention will be described in more detail with reference to Examples; however, the present invention is not limited thereto.
[Preparation of Sample Solution]
Lipoarabinomannan (LAM) (02249-61, Nacalai Tesque, Inc.) (an antigen) extracted from tubercle bacillus was added to a urine sample obtained by pooling urine samples (BioIVT LLC) of healthy subjects to prepare a sample solution of a LAM concentration shown in Table 1.
[Production of Anti-Lipoarabinomannan (LAM) Monoclonal Antibody-Modified Gold Colloid Holding Pad]
The pH was adjusted by adding 1 mL of a 50 mmol/L $KH_2PO_4$ buffer (pH 8.0) to 9 mL of a solution (product number: EM. GC50, manufactured by BBI Solutions) containing gold colloid particles (particle diameter: 50 nm). 1 mL of a 20 μg/mL anti-LAM monoclonal antibody was added to the above solution of which the pH had been adjusted, and stirring was carried out for 10 minutes. Then, after allowing to stand for 10 minutes, 550 μL of an aqueous solution containing 1% by mass of polyethylene glycol ((PEG), weight-average molecular weight (Mw.): 20,000, product number: 168-11285, manufactured by FUJIFILM Wako Pure Chemical Corporation) was added thereto, stirring was carried out for 10 minutes, and subsequently 1.1 mL of an aqueous solution of 10% by mass of bovine serum albumin ((BSA), Fraction V, product number: A-7906, manufactured by Sigma-Aldrich Co., LLC) was added thereto, and stirring was carried out for 10 minutes. This solution was subjected to centrifugal separation for 30 minutes under the conditions of 8,000×g at 4° C. using a centrifugal separator (himac CF16RX, manufactured by Hitachi, Ltd.). The supernatant solution was removed with 1 mL thereof remaining at the bottom of a container, and gold colloid particles contained in the 1 mL solution remaining at the bottom of the container were re-dispersed with an ultrasonic washer. Thereafter, they were dispersed in 20 mL of a gold colloid preservative solution (a 20 mmol/L Tris-HCl buffer (pH 8.2), 0.05% PEG (Mw.: 20,000), 150 mmol/L NaCl, 1% BSA), centrifugal separation was carried out again using the same centrifugal separator under the same conditions, the supernatant solution was removed, and after ultrasonic dispersion, they were dispersed in the gold colloid preservative solution, thereby obtaining a solution of modified gold colloid particles (a labeled antibody) which are gold colloid particles (particle diameter: 50 nm) modified with the anti-LAM monoclonal antibody. After the obtained solution was extracted with water so that a concentration of a Tris-HCl buffer (pH 8.2) was 20 mmol/L, a concentration of PEG (Mw: 20,000) was 0.05% by mass, a concentration of sucrose was 5% by mass, and an optical density of the gold colloid at 520 nm was 0.1 in a case where an optical path length was set to 10 mm, 1 mL of which was uniformly applied onto each glass fiber pad (GFDX203000 manufactured by Merck KGaA) having a size of 5 mm×30 cm, and then vacuum drying was carried out for 15 hours and the pad was cut to obtain a pad (a gold colloid holding pad) (5 mm×4 mm) on which the modified gold colloid particles (the labeled antibody), which were gold colloid particles modified with the anti-LAM monoclonal antibody, were held.
[Production of Immunochromatographic Kit]
An immunochromatographic kit was prepared as follows.
[Production of Chromatographic Carrier]
As a porous carrier, a nitrocellulose membrane (having a plastic lining, HiFlow Plus HF135 (capillary flow rate=135 seconds/cm), manufactured by Millipore Corporation) cut into a size of 60 mm×300 mm was used, and an examination region, a checking region, and an amplification indicator region were formed on this membrane to produce a chromatographic carrier.
An anti-LAM antibody solution prepared to have a concentration of 1.5 mg/mL was applied in a line shape at a position 15 mm from the downstream side of the short side of 60 mm of the nitrocellulose membrane and used as an examination region. Further, an anti-human IgG antibody (Anti-human IgG (H+L), rabbit F(ab')$_2$, product number: 309-006-003, manufactured by FUJIFILM Wako Pure Chemical Corporation) solution prepared to have a confirmation of 0.5 mg/mL was applied in a line shape at a position 11 mm from the downstream side of the short side of 60 mm and used as a checking region. Further, Bromocresol Green (manufactured by FUJIFILM Wako Pure Chemical Corporation) prepared to have a concentration of 30 mmol/L was applied in a line shape at a position 9 mm from the downstream side of the short side of 60 mm and used as an amplification indicator region. After each application, the nitrocellulose membrane was dried at 50° C. for 30 minutes in a hot air dryer. After the drying was completed, the nitrogen membrane dried as described above was immersed in a vat containing 500 mL of a borate buffer (pH 8.5) of 50 mmol/L, which contained a blocking solution (0.5% by mass casein (derived from milk, product number: 030-01505, manufactured by FUJIFILM Wako Pure Chemical Corporation)), and allowed to stand for 30 minutes as it was. Then, the nitrocellulose membrane was taken out, immersed in a 500 mL of a washing and stabilizing solution (a 50 mmol/L Tris-HCl (pH 7.5) buffer containing 0.5% by mass sucrose and 0.05% by mass sodium cholate) prepared in another vat, and allowed to stand as it was for 30 minutes. Then, the nitrocellulose membrane was taken out from the solution and dried in an environment of 25° C. for 24 hours.
The portion in which the anti-LAM antibody is immobilized corresponds to the examination region containing the second substance that binds to a test substance, the portion in which the anti-mouse IgG antibody is immobilized corresponds to the checking region containing a substance that is capable of binding to the first substance, and the portion in which Bromocresol Green is immobilized corresponds to the amplification indicator region containing a substance that reacts with the amplification solution (the reducing agent solution) enclosed in the second pot described below.
[Production of Examination Strip]
The chromatographic carrier prepared as described above was attached to a back pressure-sensitive adhesive sheet (60 mm×300 mm (manufactured by Adhesives Research, Inc.)). Next, a double-sided tape (Nitto Denko Corporation) having a width of 3 mm was fixed at a position 26 mm from the downstream side of the short side of the chromatographic carrier. Then, a pad (5 mm×30 cm) before cutting which did not hold the gold colloid was fixed on the chromatographic carrier so that the downstream end of the double-sided tape and the downstream end of the glass fiber pad (Glass Fiber Conjugate Pad, manufactured by Millipore Corporation) cut into 8 mm×300 mm overlapped each other. A liquid feeding pad (a glass fiber pad cut into 25 mm×300 mm (Glass Fiber Conjugate Pad, manufactured by Millipore Corporation)) was attached to the upstream side of the chromatographic carrier so that the liquid feeding pad and the chromatographic carrier overlapped with each other by 7 mm. The member produced in this way was cut to have a width of 5 mm with a guillotine type cutter (CM4000, manufactured by NIPPN Techno Cluster, Inc.) in parallel with a direction perpendicular to the long side of 300 mm, thereby producing sixty examination strips (however, the absorption pad was not included).

[Preparation of Amplification Solution (Reducing Agent Solution) to be Enclosed in Second Pot]

23.6 mL of an aqueous solution of 1 mol/L iron nitrate, which was produced by dissolving iron (III) nitrate nonahydrate (manufactured by FUJIFILM Wako Pure Chemical Corporation, 095-00995) in water, and 13.1 g of citric acid (manufactured by FUJIFILM Wako Pure Chemical Corporation, 038-06925) were dissolved in 290 g of water. After all of the substances were dissolved, 36 mL of a nitric acid (10% by weight) solution was added thereto while stirring with a stirrer, and 60.8 g of ammonium iron (II) sulfate hexahydrate (manufactured by FUJIFILM Wako Pure Chemical Corporation, 091-00855) was added thereto. The solution prepared in this way was used as a reducing agent solution which was the second amplification solution to be enclosed in the second pot.

[Preparation of Amplification Solution (Silver Ion Solution) to be Enclosed in First Pot]

8 mL of a silver nitrate solution (including 10 g of silver nitrate) and 24 mL of an aqueous solution of 1 mol/L iron nitrate were added to 66 g of water. Further, this solution was mixed with a solution obtained by dissolving 5.9 mL of nitric acid (10% by weight), 0.1 g of dodecyl amine (manufactured by FUJIFILM Wako Pure Chemical Corporation, 123-00246), and 0.1 g of a surfactant $C_{12}H_{25}$—$C_6H_4$—O—$(CH_2CH_2O)_{50}H$ in 47.6 g of water in advance, and the resultant solution was used as a silver ion solution which was the first amplification solution to be enclosed in the first pot.

[Production of Absorption Pad]

Sixty sheets of glass fiber pads (glass filter paper, manufactured by Advantech Co., Ltd.) cut into 12 mm×10 mm were prepared and used as absorption pads.

[Production of Parts of Immunochromatographic Kit]

The lower case 20, the upper case 10, the intermediate member 30, and the first pot 40, as well as the second pot 45, which constitute the immunochromatographic kit 100 as illustrated in FIG. 10 to FIG. 12 were each formed by injection molding using polypropylene as a material. The upper case was produced by injection molding using, as a material, polypropylene containing 50% by mass of TAFTHREN (registered trade name), which is an olefin-based elastomer manufactured by Sumitomo Chemical Co., Ltd. It is noted that the upper case 10 includes two deformable portions (the first convex deformation part and the second convex deformation part), and these two deformable portions do not have a portion separated from the upper case 10, which were produced by injection molding as part of the upper case 10 in the entire boundary part.

It is noted that the upper case of Examples is configured such that the first convex deformation part 12 illustrated in FIG. 10 and FIG. 11 has two protruding parts, and the second convex deformation part 14 has one protruding part.

[Production of Immunochromatographic Kit]

The lower case 20, the examination strip 1 produced as described above, and the absorption pad 6 produced as described above were fixed as illustrated in FIG. 10 to FIG. 12. Next, the first pot 40 and the second pot 45 were respectively filled with the first amplification solution 41 to be enclosed in the first pot 40 and the second amplification solution 46 to be enclosed in the second pot 45, which were prepared as described above, the second pot 45 was sealed with an aluminum foil as the sheet member 48, the first pot 40 was sealed with an aluminum foil as the sheet member 43, and as illustrated in FIG. 10 to FIG. 12, the second pot 45 was mounted on the lower case 20 with the sheet member 48 facing up, and the first pot 40 was mounted on the intermediate member 30 with the sheet member 43 facing down. Then, in a state where the upper case 10 and the lower case 20 were fitted to each other so that the outer circumferences thereof come into contact with each other, the contact part between the upper case and the lower case was joined by ultrasonic welding. At this time, it was confirmed that the welded parts were uniformly welded at all the parts in a sealed state. In this way, an immunochromatographic kit was produced.

Example 1

[Production of Concentration Device]

Figure 7:
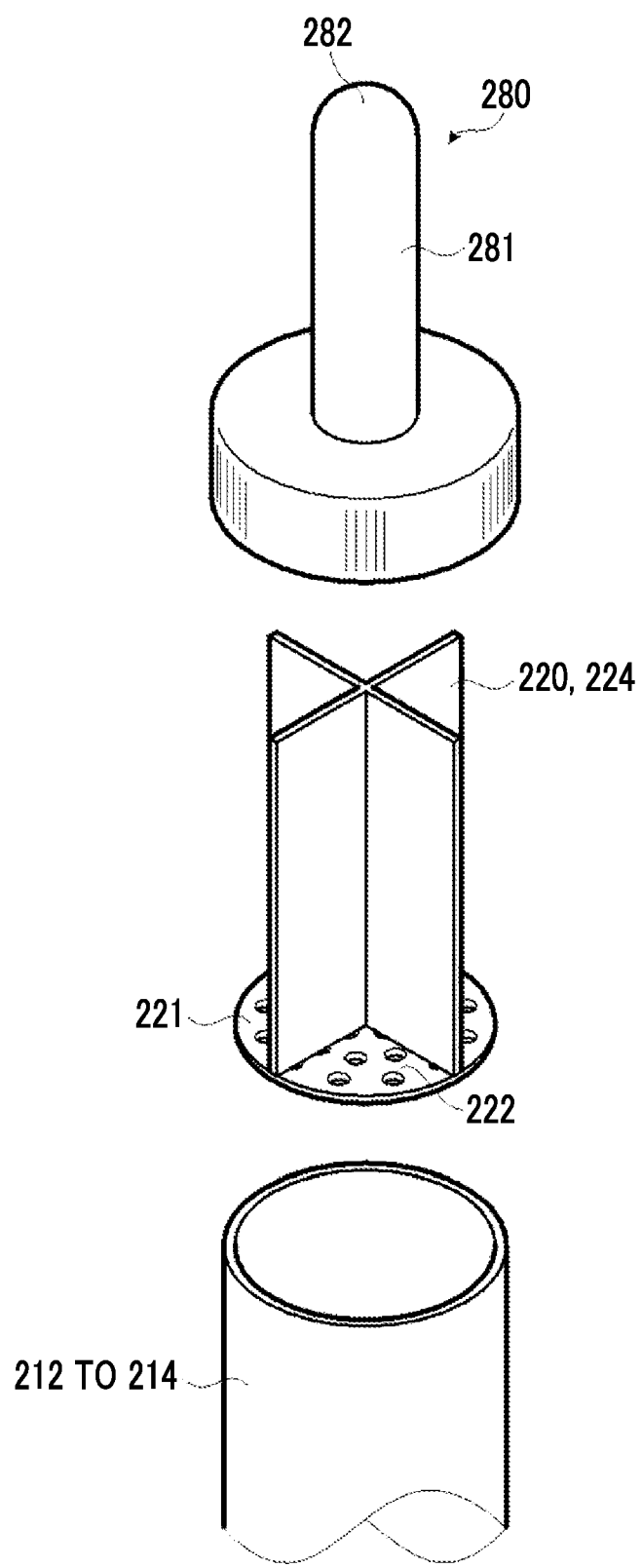
FIG. 7 is a perspective view of a part of each of concentration devices 202 to 204.

The concentration device 202 as illustrated in FIG. 1 and FIG. 7 was produced. It is noted that FIG. 7 is a perspective view of a part (an upper part) of the concentration devices 202. As illustrated in FIG. 7, the concentration device 202 of Example 1 includes a lid 280 having a recovery port 282.

Specifically, a 800 mmol/L Tricine buffer solution (pH 8.5) (347-02844, manufactured by Fujifilm Wako Pure Chemical Corporation) containing 0.2% by mass casein (030-01505, manufactured by FUJIFILM Wako Pure Chemical Corporation) and 2% by mass Tween 40 (T2531, manufactured by Tokyo Chemical Industry Co., Ltd.) was prepared, 50 µL thereof was added to the cylinder 212 (inner diameter: 12 mm, depth: 60 mm, cylinder-shaped, including an external screw in the upper part), drying was carried out in an environment of 25° C. and 10% Rh (relative humidity) or less for 3 days, and then drying under reduced pressure was carried out for 24 hours to be in a solid state, whereby a dry reagent was prepared. Further, one gold colloid holding pad (5 mm×4 mm) and 700 mg of the super absorbent polymer 230 (the super absorbent polymer described later) were added.

Further, the piston 220 insertable into the cylinder 212 and including the tip part 221 having the holes 222 (hole diameter: 1 mm, number of holes: 24) smaller than the particle diameter of the super absorbent polymer 230 after water absorption, and the lid 280 (including an internal screw) including a soft tube 281 having the recovery port 282 were prepared and bound to the cylinder 212 to complete the concentration device 202.

Here, the cylinder 212 has, at a position 3.5 mm from the bottom surface 218, the partition wall 260 that is movably installed on the inner peripheral surface of the cylinder 212 in the longitudinal direction of the cylinder 212. The partition wall 260 has the holes 262 (hole diameter: 1 mm, the number of holes: 24) smaller than the particle diameter of the super absorbent polymer 230 before water absorption. The portion (400 µl) surrounded by the bottom part 217 and the partition wall 260 corresponds to the extraction solution holding part described above. Although the partition wall 260 is positioned by a protrusion (not illustrated in the drawing) formed on an inner peripheral surface at a position 3.5 mm from the bottom surface of the cylinder 212, it can get over the protrusion and enter the extraction solution holding part by applying a pressing force from the upper part.

It is noted that as illustrated in FIG. 1, in the concentration device 202, the super absorbent polymer 230 is accommodated in the cylinder 212 on the partition wall 260 to be in contact with the partition wall 260.

<Super Absorbent Polymer>

700 mg of commercially available super absorbent polymer (SAP) particles (manufactured by M2 Polymer Technologies Inc.; SAP Sphere: 2.5 mm) were graded and used as the super absorbent polymer 230 that would be used in Examples and the like. The super absorbent polymer 230 had a particle diameter of 2.5 mm, a swelling ratio of 13 g/g, and a water absorption rate of 0.5 g/min.

[Concentration of Sample Solution]

Using the obtained concentration device 202, the above-described sample solution was concentrated as illustrated in FIG. 4.

<Sample Solution Injection Step>

First, the lid 280 and the piston 220 were removed from the concentration device 202. Then, 4.5 mL of the above-described sample solution was injected from the opening portion 216 into the cylinder 212, and stirring was carried out. At this time, a part of the sample solution (the sample solution 241: 400 µL) was introduced below the partition wall 260 through the holes 262 in the partition wall 260 (FIG. 4B).

<Water Absorption Step>

Then, the concentration device 202 was allowed to stand for 60 minutes. During this period, only water contained in the sample solution 242 (the sample solution 242 of the sample solution 240 other than the sample solution 241 held in the extraction solution holding part) present on the partition wall 260 in the sample solution 240 is almost completely absorbed by the super absorbent polymer 230, whereby the sample solution concentrate 246 which was a concentrate of the sample solution 242 was generated in the cylinder 212 (the super absorbent polymer 230 became the swollen super absorbent polymer 232) (FIG. 4C). It is noted that as described above, since the cylinder 212 included the gold colloid holding pad, the antigen-antibody reaction proceeded concurrently with the concentration, and gold particle composite bodies, which were composite bodies of the LAM contained in the sample solution and the modified gold colloid particle (the labeled antibody) contained in the cylinder, which was a gold colloid particle modified with the anti-LAM monoclonal antibody, were formed. That is, in the obtained sample solution concentrate 246, the LAM forms the gold particle composite body which is a composite body with the modified gold colloid particle (the labeled antibody).

<Extraction Solution Addition Step>

Next, the piston 220 was inserted into the cylinder 212 from the opening portion 216, the super absorbent polymer 232 was push down to move the partition wall 260 to the bottom surface 218 of the cylinder 212, and the sample solution 241 held in the extraction solution holding part was introduced above the partition wall 260 through the holes 262 in the partition wall 260. In this way, the sample solution 241 held in the extraction solution holding part was added to the sample solution concentrate 246 (FIG. 4D).

<Taking-Out Step>

Then, the piston 220 was inserted into the cylinder 212 from the opening portion 216, and the lid 280 was closed from above the piston 220. By closing the lid 280 with a screw, the piston 220 was pushed down to obtain the sample solution concentrated solution 248, which was a concentrated solution of the sample solution, through the holes 222 of the tip part 221 of the piston 220 (FIG. 4E). The concentration device 202 was reversed, the obtained sample solution concentrated solution 248 was moved to the soft tube 281, and the soft tube 281 was pushed to take out the sample solution concentrated solution 248 from the recovery port 282. It is noted that as described above, the LAM forms the gold particle composite body in the sample solution concentrated solution 248, similarly in the sample solution concentrate 246 obtained in the water absorption step.

[Detection of LAM]

The obtained sample solution concentrated solution 248 (24 µL) was added dropwise to the immunochromatographic kit prepared as described above. Immediately after the dropwise addition, the second convex deformation part 14 was depressed to break the aluminum foil which was the sheet member 48 that sealed the second amplification solution 46 enclosed in the second pot 45, and the liquid feeding pad 4 was immersed in the second pot 45 to supply the second amplification solution 46 to the porous carrier 2 by utilizing capillary action.

After the amplification indicator region $L_3$ was discolored from green to orange, the first convex deformation part 12 was depressed to move the first pot 40 toward the breaking part 34 of the pot accommodating part 32 of the intermediate member 30, thereby pushing and breaking the aluminum foil which was the sheet member 43 that sealed the first pot 40, with the breaking part 34, and the silver ion solution, which was the first amplification solution 41, was supplied to the porous carrier 2 from the opening portion of the intermediate member 30 to carry out the silver amplification reaction. The silver amplification reaction is completed in several tens of seconds.

After the completion of the silver amplification reaction, coloration was visually checked. The results are shown in Table 1.

+: The coloration is observed.
−: No coloration is observed.

Example 2

[Production of Concentration Device]

The concentration device 203 as illustrated in FIG. 2 and FIG. 7 was produced. It is noted that the concentration device 203 of Example 2 is the same as the concentration device 202 of Example 1 except that the cylinder 212 is the cylinder 213.

Specifically, a concentration device (the concentration device 203) was produced according to the same procedure as in Example 1, except that the cylinder 213 (inner diameter: 12 mm, depth: 60 mm, cylinder-shaped, including an external screw in the upper part) was used instead of the cylinder 212.

Here, the porous synthetic resin 270 (a sponge made of (polyvinyl alcohol (PVA)) (void ratio: 90%) is accommodated in the bottom part 217 (4 mm from the bottom surface 218) of the cylinder 213. The holes (not illustrated in the drawing) included the synthetic resin 270 are smaller than the particle diameter of the super absorbent polymer 230 before water absorption. The holes of the synthetic resin 270 correspond to the extraction solution holding part described above.

It is noted that as illustrated in FIG. 2, in the concentration device 203, the super absorbent polymer 230 is accommodated in the cylinder 213 on the synthetic resin 270 to be in contact with the synthetic resin 270.

[Concentration of Sample Solution]

Using the obtained concentration device 203, the above-described sample solution was concentrated as illustrated in FIG. 5.

<Sample Solution Injection Step>

First, the lid 280 and the piston 220 were removed from the concentration device 203. Then, 4.5 mL of the above-described sample solution was injected into the cylinder 213 from the opening portion 216, and stirring was carried out. At this time, a part (the sample solution 241: 400 µL) of the sample solution was introduced into the holes of the synthetic resin 270 (the synthetic resin 270 became the synthetic resin 272 having holes into which the sample solution 241 which was a part of the sample solution 240 had been introduced) (FIG. 5B).

<Water Absorption Step>

Then, the concentration device 203 was allowed to stand for 60 minutes. During this period, only water contained in the sample solution 242 (the sample solution 242 of the sample solution 240 other than the sample solution 241 held in the extraction solution holding part) present on the synthetic resin 270 in the sample solution 240 is almost completely absorbed by the super absorbent polymer 230, whereby the sample solution concentrate 246 which was a concentrate of the sample solution 242 was generated in the cylinder 213 (the super absorbent polymer 230 became the swollen super absorbent polymer 232) (FIG. 5C). It is noted that as in Example 1, in the obtained sample solution concentrate 246, the LAM forms the gold particle composite body which is a composite body with the modified gold colloid particle (the labeled antibody).

<Extraction Solution Addition Step>

Next, the piston 220 was inserted into the cylinder 213 from the opening portion 216, the super absorbent polymer 232 was pushed down to crush the synthetic resin 270, and the sample solution 241 held in the extraction solution holding part was introduced above the synthetic resin 270 through the holes of the synthetic resin 270. In this way, the sample solution 241 held in the extraction solution holding part was added to the sample solution concentrate 246 (FIG. 5D).

<Taking-Out Step>

Then, the sample solution concentrated solution 248 was taken out according to the same procedure as in Example 1.

[Detection of LAM]

The obtained sample solution concentrated solution 248 (24 µL) was subjected to the detection of LAM according to the same procedure as in Example 1. The results are shown in Table 1.

Example 3

[Production of Concentration Device]

Figure 8:
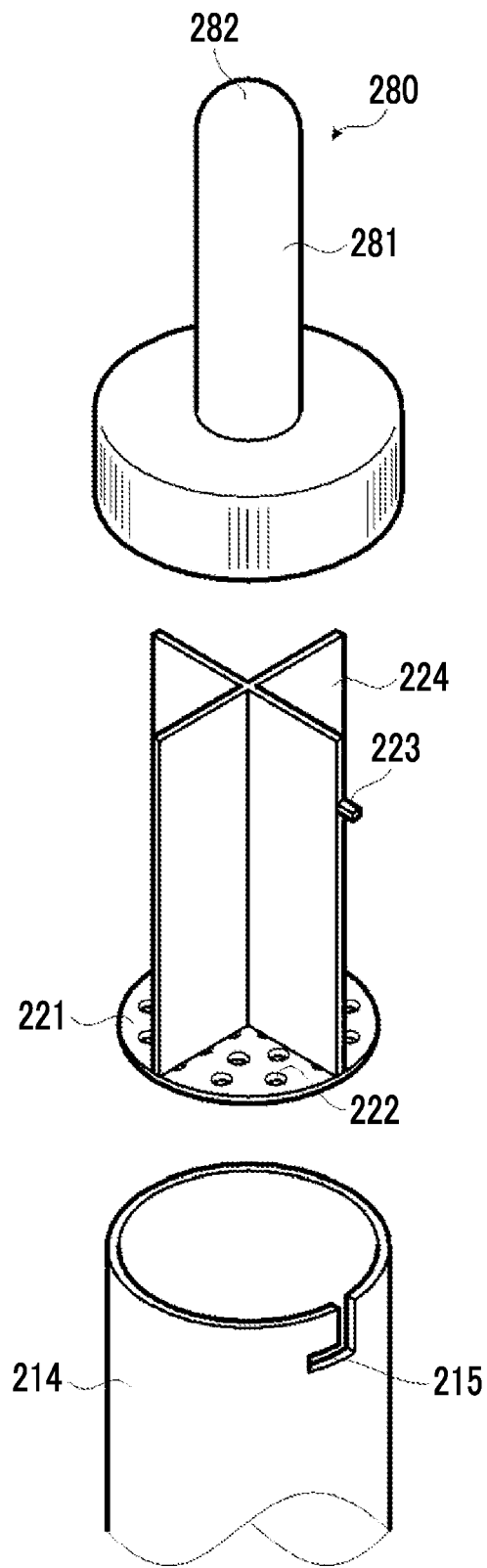
FIG. 8 is a perspective view of a part of the concentration devices 204.

The concentration device 204 as illustrated in FIG. 3 and FIGS. 7 and 8 was produced. It is noted that the concentration device 204 of Example 3 is the same as the concentration device 202 of Example 1 except that the cylinder 212 is the cylinder 214 and the piston 220 is the piston 224.

Specifically, a concentration device (the concentration device 204) was produced according to the same procedure as in Example 1, except that the cylinder 214 (inner diameter: 12 mm, depth: 60 mm, cylinder-shaped, including an external screw in the upper part) was used instead of the cylinder 212 and the piston 224 was used instead of the piston 220.

Here, the cylinder 214 and the piston 224 include a piston position fixing mechanism with which the tip part 221 of the piston 224 is fixed at the position A described above (specifically, a position 3.5 mm from the solution surface 244 of the sample solution 240 to be injected into the cylinder 214 in the sample solution injection step described later) against pressure in association with the water absorption expansion of the super absorbent polymer 230.

More specifically, as illustrated in FIG. 8, the cylinder 214 includes a notch 215, and the piston 224 includes a protrusion 223. The piston 224 is inserted into the cylinder 214, and the protrusion 223 of the piston 224 is hooked onto the notch 215 of the cylinder 214, whereby the tip part 221 of the piston 224 can be fixed at the position A against pressure in association with the water absorption expansion of the super absorbent polymer 230.

[Concentration of Sample Solution]

Using the obtained concentration device 204, the above-described sample solution was concentrated as illustrated in FIG. 6.

<Sample Solution Injection Step>

First, the lid 280 and the piston 220 were removed from the concentration device 204. Then, 4.5 mL of the above-described sample solution was injected into the cylinder 214 from the opening portion 216, and the piston 224 was inserted into the cylinder 214, while carrying out stirring, to hook the protrusion 223 of the piston 224 onto the notch 215 of the cylinder 214, whereby the tip part 221 of the piston 224 was fixed at the position A described above. At this time, a part (the sample solution 241: 400 µL) of the sample solution is introduced above the tip part 221 of the piston 224 through the holes 222 in the tip part 221 of the piston 224 (FIG. 6B).

<Water Absorption Step>

Then, the concentration device 204 was allowed to stand for 60 minutes. During this period, only water contained in the sample solution 242 (the sample solution 242 of the sample solution 240 other than the sample solution 241 held in the extraction solution holding part) present under the tip part 221 of the piston 224 in the sample solution 240 is almost completely absorbed by the super absorbent polymer 230, whereby the sample solution concentrate 246 which was a concentrate of the sample solution 242 was generated in the cylinder 214 (the super absorbent polymer 230 became the swollen super absorbent polymer 232) (FIG. 6C). It is noted that as in Example 1, in the obtained sample solution concentrate 246, the LAM forms the gold particle composite body which is a composite body with the modified gold colloid particle (the labeled antibody).

<Extraction Solution Addition Step>

Next, the piston 224 was pulled up, and the sample solution 241 present on the tip part 221 of the piston 224 was introduced below the tip part 221 of the piston 224 through holes 222 in the tip part 221 of the piston 224, whereby the sample solution 241 present on the tip part 221 of the piston 224 was added to the sample solution concentrate 246 (FIG. 6D).

<Taking-Out Step>

Then, the sample solution concentrated solution 248 was taken out according to the same procedure as in Example 1.

[Detection of LAM]

The obtained sample solution concentrated solution 248 (24 µL) was subjected to the detection of LAM according to the same procedure as in Example 1. The results are shown in Table 1.

Comparative Example 1

A concentration device (a comparative device 1) was produced according to the same procedure as in Example 1, except that the super absorbent polymer 230 was not added to the cylinder 212 (however, the partition wall 260 was not included).

As a result of carrying out the concentration of the sample solution according to the same procedure as in Example 1 except that the obtained comparative device 1 was used, the sample solution itself was taken out without being concentrated. Then, the taken-out sample solution was subjected to the detection of LAM according to the same procedure as in Example 1. The results are shown in Table 1.

Example 4

The concentration device 202 was produced according to the same procedure as in Example 1, except that 300 mg of the super absorbent polymer 230 was added to the cylinder 211.

The sample solution concentrated solution was taken out and subjected to the detection of LAM according to the same procedure as in Example 1, except that the obtained concentration device 202 was used. The results are shown in Table 1.

Comparative Example 2

The sample solution injection step, the water absorption step, and the extraction solution addition step were carried out in the same manner as in Example 1. Then, as a result of making an attempt to take out the sample solution concentrated solution by tilting the cylinder 212 without using the piston 220, the sample solution concentrated solution could not be taken out.

Comparative Example 3

A concentration device (a comparative device 2) was produced according to the same procedure as in Example 1, except that the cylinder 212 (however, the partition wall 260 was not included) was used as the cylinder 212.

Using the obtained comparative device 2, the sample solution injection step (however, a part of the sample solution was not held) and the water absorption step were carried out in the same manner as in Example 1. Then, as a result of carrying out the taking-out step in the same manner as in Example 1 without adding the extraction solution, the sample solution concentrated solution (the sample solution concentrate) could not be taken out.

solution was not added, the sample solution concentrated solution (the sample solution concentrate) could not be taken out.

EXPLANATION OF REFERENCES

1: examination strip
2: insoluble carrier (porous carrier)
3: label holding pad (glass fiber pad)
4: liquid feeding pad
6: absorption pad
7: back pressure-sensitive adhesive sheet
9: housing case
10: upper case
12: first convex deformation part
12a: top of first convex deformation part
12b: protruding part of first convex deformation part
12c: slope of first convex deformation part
14: second convex deformation part
14a: top of second convex deformation part
14b: protruding part of second convex deformation part
16: opening pore for dropwise addition of specimen solution
18: observation window
20: lower case
21: insoluble carrier accommodating part (porous carrier accommodating part)
22: absorption pad accommodating part
24: second pot accommodating part
30: intermediate member
32: first pot accommodating part
34: breaking part
35: flow channel forming part
36: back surface of flow channel forming part 35
40: first pot for first amplification solution
41: first amplification solution
42: pot container
43: sheet member
45: second pot for second amplification solution
46: second amplification solution
47: pot container
48: sheet member
100: immunochromatographic kit
114: convex deformation part
114a: top of convex deformation part 114
114b: protruding part of convex deformation part 114

TABLE 1

| LAM concentration [ng/ml] | Example 1 | Example 2 | Example 3 | Example 4 | Comparative Example 1 | Comparative Example 2 | Comparative Example 3 |
|---|---|---|---|---|---|---|---|
| 0.005 | + | + | + | + | − | Unexecutable | Unexecutable |
| 0.05 | + | + | + | + | + | Unexecutable | Unexecutable |

In a case of concentrating the sample solution by using Examples 1 to 4 which are the concentration devices according to the embodiment of the present invention, a sample solution concentrated solution having a desired concentration fold ratio could be obtained. On the other hand, in Comparative Example 1 in which the super absorbent polymer was not used, the sample solution could not be concentrated. In addition, in Comparative Example 2 in which the predetermined piston was not used, the sample solution concentrated solution could not be taken out. Further, in Comparative Example 3 as well in which the extraction 202, 203, 204: concentration device
212, 213, 214: cylinder
215: notch
216: opening portion
217: bottom part
218: bottom surface
220, 224: piston
221: tip part
222: holes in tip part
223: protrusion 230: super absorbent polymer (super absorbent polymer before water absorption)
232: super absorbent polymer (super absorbent polymer after water absorption) (swollen super absorbent polymer)
240, 241, 242: sample solution
244: solution surface of sample solution
246: sample solution concentrate
248: sample solution concentrated solution
250: extraction solution
260: partition wall
262: holes in partition wall
270: synthetic resin
272: synthetic resin having holes into which sample solution is introduced
280: lid having recovery port
281: soft tube
282: recovery port
300: nitrocellulose membrane
301: gold colloid holding pad
302: test line
303: control line
304: coloring reagent immobilization line

What is claimed is:

1. A concentration device for concentrating a sample solution which is an aqueous solution containing a high-molecular-weight molecule, the concentration device comprising:
   a cylinder that accommodates a particulate super absorbent polymer; and
   a piston that is insertable into the cylinder,
   wherein the cylinder has, at a bottom part, a liquid holding part for holding a part of the sample solution injected into the cylinder,
   the super absorbent polymer is accommodated on the liquid holding part in the cylinder to be in contact with the liquid holding part,
   the piston includes a tip part having holes smaller than a particle diameter of the super absorbent polymer after water absorption,
   the super absorbent polymer absorbs water contained in the sample solution, other than the sample solution held in the liquid holding part in the sample solution injected into the cylinder, to generate a sample solution concentrate which is a concentrate of the sample solution, in the cylinder,
   the sample solution held in the liquid holding part is added to the sample solution concentrate, and
   the piston is inserted into the cylinder to take out a sample solution concentrated solution, which is a concentrated solution of the sample solution, from the holes in the tip part of the piston.

2. The concentration device according to claim 1,
   wherein the liquid holding part is a portion surrounded by the bottom part of the cylinder and a partition wall movably installed on an inner peripheral surface of the cylinder in a longitudinal direction of the cylinder, where the partition wall has holes smaller than a particle diameter of the super absorbent polymer before water absorption,
   the partition wall is moved to the bottom surface of the cylinder to introduce the sample solution held in the liquid holding part onto the partition wall through the holes in the partition wall, and
   the sample solution introduced above the partition wall is added to the sample solution concentrate.

3. The concentration device according to claim 1,
   wherein the liquid holding part is a portion formed from holes included in a porous resin accommodated in the bottom part of the cylinder, where the holes included in the resin are smaller than a particle diameter of the super absorbent polymer before water absorption,
   the resin is crushed to introduce the sample solution held in the liquid holding part onto the resin through the holes in the resin, and
   the sample solution introduced above the resin is added to the sample solution concentrate.

4. The concentration device according to claim 3,
   wherein the porous resin is a sponge.

5. A concentration device for concentrating a sample solution which is an aqueous solution containing a high-molecular-weight molecule, the concentration device comprising:
   a cylinder that accommodates a particulate super absorbent polymer; and
   a piston that is insertable into the cylinder,
   wherein the piston includes a tip part having holes smaller than a particle diameter of the super absorbent polymer after water absorption,
   the cylinder has a liquid holding part for holding the sample solution present on a tip part of the piston in the sample solution injected into the cylinder, by fixing the tip part of the piston to a position lower than a solution surface of the sample solution injected into the cylinder and higher than the super absorbent polymer accommodated in the cylinder,
   the super absorbent polymer is accommodated under the liquid holding part in the cylinder through the piston,
   the cylinder and the piston include a piston position fixing mechanism for fixing the tip part of the piston to the position against pressure associated with water absorption expansion of the super absorbent polymer,
   the super absorbent polymer absorbs water contained in the sample solution, other than the sample solution held in the liquid holding part in the sample solution injected into the cylinder, to generate a sample solution concentrate which is a concentrate of the sample solution, in the cylinder,
   the piston position fixing mechanism is released, the piston is pulled up, and the sample solution present on the tip part of the piston is introduced below the tip part of the piston through holes in the tip part of the piston to add the sample solution present on the piston to the sample solution concentrate, and
   the piston is pulled down again into the cylinder to take out a sample solution concentrated solution, which is a concentrated solution of the sample solution, from the holes in the tip part of the piston.

6. The concentration device according to claim 1,
   wherein the cylinder further includes a lid having a recovery port for recovering the sample solution concentrated solution.

7. The concentration device according to claim 1,
   wherein a water absorption rate of the super absorbent polymer is 0.01 g/min or more and 40 g/min or less per 1 g of the super absorbent polymer.

8. The concentration device according to claim 1,
   wherein a particle diameter of the super absorbent polymer is 5 mm or less.

9. The concentration device according to claim 1,
   wherein a swelling ratio of the super absorbent polymer is more than 0.2 g/g and less than 800 g/g.

10. The concentration device according to claim 1, wherein the sample solution is an aqueous solution containing a high-molecular-weight molecule contained in a biological fluid.

11. The concentration device according to claim 10, wherein the cylinder further contains a binding substance that specifically binds to the high-molecular-weight molecule contained in the biological fluid.

12. The concentration device according to claim 11, wherein the binding substance is contained in the cylinder as a composite body with metal particles.

13. The concentration device according to claim 11, wherein the high-molecular-weight molecule contained in the biological fluid is an antigen, and the binding substance is an antibody against the antigen.

14. The concentration device according to claim 1, wherein the cylinder further contains at least one selected from the group consisting of casein and tricine.

15. A sample solution concentration method in which a sample solution which is an aqueous solution containing a high-molecular-weight molecule is concentrated using the concentration device according to claim 1, the sample solution concentration method comprising, in the following order:
   a sample solution injection step of injecting the sample solution into the cylinder while holding, in the liquid holding part, a part of the sample solution injected into the cylinder;
   a water absorption step in which water contained in the sample solution, other than the sample solution held in the liquid holding part in the sample solution injected into the cylinder, is absorbed by the super absorbent polymer accommodated in the cylinder, to generate the sample solution concentrate in the cylinder;
   a liquid addition step of adding the sample solution held in the liquid holding part to the sample solution concentrate; and
   a taking-out step of inserting, into the cylinder, the piston insertable into the cylinder and including the tip part having holes smaller than a particle diameter of the super absorbent polymer after water absorption, to take out a sample solution concentrated solution, which is a concentrated solution of the sample solution, through the holes in the tip part of the piston.

16. A sample solution examination method in which a high-molecular-weight molecule is detected in a sample solution which is an aqueous solution containing a high-molecular-weight molecule, the sample solution examination method comprising, in the following order:
   a concentration step of using the sample solution concentration method according to claim 15 to obtain the sample solution concentrated solution; and
   a detection step of detecting the high-molecular-weight molecule in the obtained sample solution concentrated solution.

17. The sample solution examination method according to claim 16, wherein the sample solution is an aqueous solution in which an antigen is containable, and
   the detection step is a step of detecting the antigen in the antigen-concentrated solution by immunochromatography using an antigen-antibody reaction.

18. The examination method according to claim 17, wherein the detection step includes an amplification step of amplifying information on the antigen in the antigen-concentrated solution.

19. An examination kit for detecting a high-molecular-weight molecule in a sample solution which is an aqueous solution containing a high-molecular-weight molecule, the examination kit comprising:
   the concentration device according to claim 1.

20. The examination kit according to claim 19, wherein the detection device is an immunochromatograph.

* * * * *